United States Patent
Nguyen et al.

(10) Patent No.: US 11,451,304 B1
(45) Date of Patent: *Sep. 20, 2022

(54) BLIND ESTIMATION OF RESIDUAL CHROMATIC DISPERSION AND CARRIER FREQUENCY OFFSET

(71) Applicants: Tung Trong Nguyen, Kanata (CA); Timothy James Creasy, Manotick (CA); Shahab Oveis Gharan, Ottawa (CA)

(72) Inventors: Tung Trong Nguyen, Kanata (CA); Timothy James Creasy, Manotick (CA); Shahab Oveis Gharan, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/524,251

(22) Filed: Nov. 11, 2021

Related U.S. Application Data

(63) Continuation-in-part of application No. 17/333,557, filed on May 28, 2021, now Pat. No. 11,190,277.

(51) Int. Cl.
*H04B 10/61* (2013.01)
*H04B 10/2513* (2013.01)
(Continued)

(52) U.S. Cl.
CPC ..... *H04B 10/6161* (2013.01); *H04B 10/2513* (2013.01); *H04L 27/0014* (2013.01); *H04L 27/2657* (2013.01); *H04L 2027/0026* (2013.01)

(58) Field of Classification Search
None
See application file for complete search history.

(56) References Cited

U.S. PATENT DOCUMENTS

| | | | | |
|---|---|---|---|---|
| 7,701,842 | B2 * | 4/2010 | Roberts | H04B 10/65 398/198 |
| 8,005,368 | B2 * | 8/2011 | Roberts | H04B 10/6971 398/208 |

(Continued)

OTHER PUBLICATIONS

Asvial and Paramitha, "Analysis of high order dispersion and nonlinear effects in fiber optic transmission with Non Linear Schrodinger Equation model," 2015 International Conference on Quality in Research (QiR), 2015.

(Continued)

*Primary Examiner* — David W Lambert
(74) *Attorney, Agent, or Firm* — Integral Intellectual Property Inc.; Amy Scouten; Miriam Paton

(57) ABSTRACT

Upon receiving a communications signal conveying symbols at a symbol period T, a receiver applies filter coefficients to a digital representation of the communications signal, thereby generating filtered signals having a shape in the frequency domain characterized by a bandwidth expansion factor $\alpha$, where components of the filtered signals correspond to angular frequencies $$\omega = -\frac{\pi(1+\alpha)}{T} \ldots -\frac{\pi(1-\alpha)}{T}, +\frac{\pi(1-\alpha)}{T} \ldots +\frac{\pi(1+\alpha)}{T}.$$

The receiver calculates first-order components from a first phase derivative of the components at a first differential distance, second-order components from a second phase derivative of the first-order components at a second differential distance, and composite second-order components from an average of the second-order components over multiple time intervals. Using the composite second-order components, the receiver calculates at least one of (i) an estimate of residual chromatic dispersion (CD) associated (Continued)

with the filtered signals, and (ii) an estimate of carrier frequency offset (CFO) associated with the filtered signals.

20 Claims, 8 Drawing Sheets

(51) Int. Cl.
    *H04L 27/26*      (2006.01)
    *H04L 27/00*      (2006.01)

(56) References Cited

U.S. PATENT DOCUMENTS

| | | | |
|---|---|---|---|
| 8,385,747 | B2 | 2/2013 | Roberts et al. |
| 9,094,122 | B2 | 7/2015 | Roberts et al. |
| 9,337,934 | B1* | 5/2016 | Agazzi .................. H04B 10/61 |
| 9,590,731 | B2 | 3/2017 | Roberts et al. |
| 10,819,432 | B1 | 10/2020 | Oveis Gharan et al. |
| 11,190,277 | B1* | 11/2021 | Nguyen ............ H04B 10/0799 |
| 2012/0128376 | A1* | 5/2012 | Sun .................... H04B 10/6162 |
| | | | 398/208 |
| 2012/0219302 | A1* | 8/2012 | Sun ........................ H04L 7/027 |
| | | | 398/208 |
| 2016/0226596 | A1* | 8/2016 | Stojanovic ....... H04B 10/07951 |
| 2017/0054513 | A1* | 2/2017 | Guo .................. H04B 10/6164 |
| 2021/0109563 | A1 | 4/2021 | Oveis Gharan et al. |
| 2021/0152242 | A1 | 5/2021 | Oveis Gharan et al. |

OTHER PUBLICATIONS

Berscheid, "FPGA-Based DOCSIS Upstream Demodulation, Section 4.4.2, Phase noise model", University of Saskatchewan, 2011.
Godard D. N., et al., "Passband Timing Recovery in an All-Digital Modem Receiver", IEEE Trans. Communications, May 1978, vol. 26, Issue. 5, pp. 517-523.
Hauske F N., et al., "Precise, Robust and Least Complexity CD Estimation", Optical Fiber Communication Conference, Paper JVVA032, 2011, pp. 1-3.
Magarini et al., "Pilot-Symbols-Aided Carrier-Phase Recovery for 100-G PM-QPSK Digital Coherent Receivers," IEEE Photonics Technology Letters, vol. 24, No. 9, pp. 739-741, May 2012.
Roberts K., et al., "Performance of Dual-Polarization QPSK for Optical Transport Systems", Journal of Lightwave Technology, Aug. 2009, vol. 27, No. 16, pp. 3546-3559.
Spalvieri and Barletta, "Pilot-Aided Carrier Recovery in the Presence of Phase Noise," IEEE Transactions on Communications, vol. 59, No. 7, pp. 1966-1974, Jul. 2011.
Sui Q., et al., "Fast and Robust Blind Chromatic Dispersion Estimation Using Auto-Correlation of Signal Power Waveform for Digital Coherent Systems", Journal of Lightwave Technology, vol. 31, No. 2, Jan. 15, 2013, pp. 306-312.

\* cited by examiner

BLIND ESTIMATION OF RESIDUAL CHROMATIC DISPERSION AND CARRIER FREQUENCY OFFSET

CROSS-REFERENCE TO RELATED APPLICATIONS

This application is a continuation-in-part of U.S. patent application Ser. No. 17/333,557 filed May 28, 2021.

TECHNICAL FIELD

This document relates to the technical field of optical communications.

BACKGROUND

In an optical communication network, an optical transmitter may transmit an optical signal over a communication channel to an optical receiver, where the signal is representative of digital information in the form of symbols or bits. The receiver may process the signal received over the communication channel to recover estimates of the symbols or bits. Various components of the optical communication network may contribute to signal degradation, such that the signal received at the receiver comprises a degraded version of the signal that was generated at the transmitter. Degradation or distortion may be caused by polarization mode dispersion (PMD), polarization dependent loss or gain (PDL or PDG), amplified spontaneous emission (ASE), wavelength-dependent dispersion or chromatic dispersion (CD), and other effects.

CD causes a signal to broaden as it travels down a length of fiber. This broadening is the result of different velocities experienced by different spectral components of the signal. A technique known as dispersion compensation may be used to compensate for the net CD in a given link. Dispersion compensation is achieved by providing a negative dispersion to oppose the positive dispersion in the link. Dispersion compensation may be performed using some combination of pre-compensation at the transmitter and post-compensation at the receiver. The sum of the CD pre-compensation and post-compensation should always be substantially equal to the net CD of the link but with the opposite sign, so as to substantially compensate for the net CD of the link. The amount of CD detected in a communications signal at the receiver may be referred to as the residual CD, and is equivalent to any remaining portion of the net CD in the link that was not already compensated for by the CD pre-compensation applied at the transmitter.

In general, the carrier frequency generated at a transmitter oscillator differs from the carrier frequency generated at a receiver oscillator. The difference between the two carrier frequencies may be referred to as carrier frequency offset (CFO). The ability to accurately estimate the CFO at the receiver is important for decoding digital information from coherent optical signals.

SUMMARY

According to a broad aspect, a receiver apparatus comprises a communication interface configured to receive a communications signal conveying symbols at a symbol period T, where T is a positive real number. The receiver apparatus comprises circuitry configured to apply filter coefficients to a digital representation of the communications signal, thereby generating filtered signals having a shape in the frequency domain characterized by a bandwidth expansion factor $\alpha$, wherein $\alpha$ is a real number satisfying $0<\alpha\leq 1$, and where components of the filtered signals correspond to a range of angular frequencies.

$$\omega = -\frac{\pi(1+\alpha)}{T}\ldots-\frac{\pi(1-\alpha)}{T}, +\frac{\pi(1-\alpha)}{T}\ldots+\frac{\pi(1+\alpha)}{T}.$$

The receiver apparatus comprises circuitry configured to calculate first-order components from a first phase derivative of the components of the filtered signals at a first differential distance. The receiver apparatus comprises circuitry configured to calculate second-order components from a second phase derivative of the first-order components at a second differential distance. The receiver apparatus comprises circuitry configured to calculate composite second-order components from an average of the second-order components over a plurality of time intervals. The receiver apparatus comprises circuitry configured to calculate, using the composite second-order components, at least one of (i) an estimate of residual chromatic dispersion (CD) associated with the filtered signals, and (ii) an estimate of carrier frequency offset (CFO) associated with the filtered signals.

According to one example, the receiver apparatus comprises circuitry configured to calculate updated filter coefficients using the estimate of the residual CD, and circuitry configured to apply the updated filter coefficients to the digital representation of the communications signal, thereby generating updated filtered signals.

According to another example, the estimate of the residual CD comprises an initial estimate based on an initial value of the second differential distance, and the receiver apparatus comprises circuitry configured to calculate a subsequent estimate of the residual CD associated with the updated filtered signals based on a subsequent value of the second differential distance, where the subsequent value of the second differential distance exceeds the initial value of the second differential distance, and where the initial estimate of the residual CD exceeds the subsequent estimate of the residual CD.

According to another example, the receiver apparatus comprises circuitry configured to calculate third-order components from a third phase derivative of the composite second-order components at a third differential distance, and circuitry configured to calculate the estimate of the residual CD using an average of the third-order components over a plurality of frequencies.

According to another example, the receiver apparatus comprises circuitry configured to calculate a timing bin corresponding to a peak magnitude of an inverse Fourier transform of the composite second-order components, and circuitry configured to calculate the estimate of the residual CD using the timing bin.

According to another example, the receiver apparatus comprises circuitry configured to perform carrier recovery on the filtered signals using the estimate of the CFO.

According to another example, the receiver apparatus comprises circuitry configured to calculate either a frequency corresponding to a peak magnitude of the composite second-order components or a frequency corresponding to a center of gravity of the magnitudes of the composite second-order components, and circuitry configured to calculate the estimate of the CFO using the frequency.

According to another example, the receiver apparatus comprises circuitry configured to calculate a frequency shift of an expected shape of the composite second-order components that maximizes a correlation between the composite second-order components and the expected shape, and circuitry configured to calculate the estimate of the CFO using the frequency shift.

According to another example, the receiver apparatus comprises circuitry configured to calculate an autocorrelation of an inverse Fourier transform of the composite second-order components, and circuitry configured to calculate the estimate of the CFO using the autocorrelation.

According to another example, the estimate of the CFO is calculated using only the composite second-order components having magnitudes equal to or greater than a predefined threshold.

DETAILED DESCRIPTION

Figure 1:
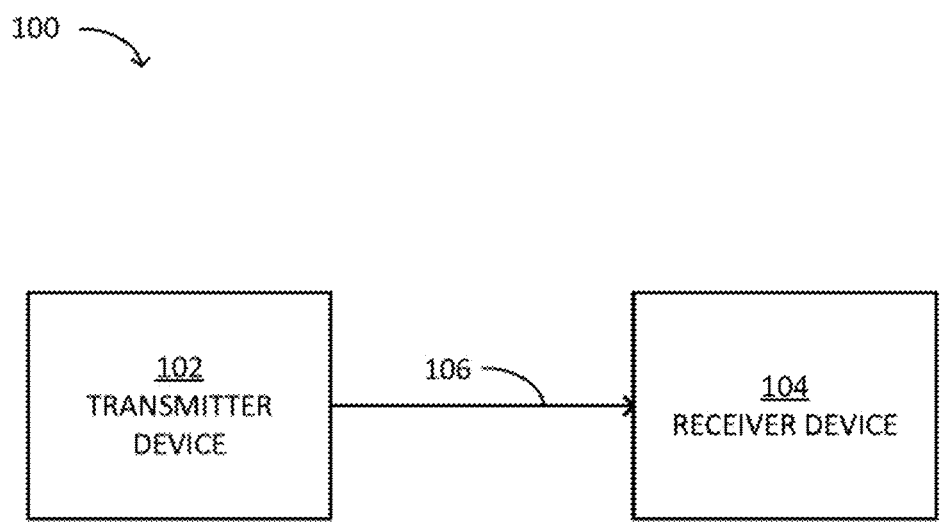
FIG. 1 illustrates an example communication network in accordance with some examples of the technology disclosed herein.

FIG. 1 illustrates an example communication network 100, in accordance with some examples of the technology disclosed herein.

The communication network 100 may comprise at least one transmitter device 102 and at least one receiver device 104, where the transmitter device 102 is capable of transmitting signals over a communication channel, such as a communication channel 106, and where the receiver device 104 is capable of receiving signals over a communication channel, such as the communication channel 106. According to some examples, the transmitter device 102 is also capable of receiving signals. According to some examples, the receiver device 104 is also capable of transmitting signals. Thus, one or both of the transmitter device 102 and the receiver device 104 may be capable of acting as a transceiver. According to one example, the transceiver may comprise a modem. The signals transmitted in the communication network 100 may be representative of digital information in the form of symbols or bits.

The communication network 100 may comprise additional elements not illustrated in FIG. 1. For example, the communication network 100 may comprise one or more additional transmitter devices, one or more additional receiver devices, one or more controller devices, and one or more other devices or elements involved in the communication of signals in the communication network 100.

According to some examples, the signals that are transmitted and received in the communication network 100 may comprise any combination of electrical signals, optical signals, and wireless signals. For example, the transmitter device 102 may comprise a first optical transceiver, the receiver device 104 may comprise a second optical transceiver, and the communication channel 106 may comprise an optical communication channel. According to one example, one or both of the first optical transceiver and the second optical transceiver may comprise a coherent modem.

Each optical communication channel in the communication network 100 may include one or more links, where each link may comprise one or more spans, and each span may comprise a length of optical fiber and one or more optical amplifiers.

Where the communication network 100 involves the transmission of optical signals, the communication network 100 may comprise additional optical elements not illustrated in FIG. 1, such as wavelength selective switches, optical multiplexers, optical de-multiplexers, optical filters, and the like. Frequency division multiplexing (FDM) may be used to digitally divide up the modulated optical spectrum into a plurality of subcarriers, each with a different center frequency, such that each subcarrier may be used to transmit a signal that is representative of a different stream of symbols. In this manner, a plurality of symbol streams may be simultaneously communicated, in parallel, over the optical communication channel 106. FDM is possible when the frequencies of the subcarriers are sufficiently separated that the bandwidths of the signals do not significantly overlap. Each different subcarrier corresponds to a different FDM sub-band, also referred to as a FDM channel. Wavelength division multiplexing (WDM) may be used to transmit a plurality of data streams in parallel, over a respectively plurality of carriers, where each carrier is generated by a different laser.

According to some examples, a signal generated at the transmitter device 102 may be representative of a stream of symbols to be transmitted at times set by a transmitter symbol clock, where the frequency of the transmitter symbol clock is set to be, for example, a certain ratio or fraction of a transmitter sampling frequency which may be set by a voltage controlled oscillator (VCO) and associated clocking circuits at the transmitter device 102. The frequency of the symbol clock at the transmitter device 102 may be referred to as the transmitter symbol frequency or symbol rate or baud rate (which may be denoted herein by $f_S$ in Hertz or $\omega$ in radians/sec). At the receiver device 104, estimates of the symbols may be recovered by sampling the received signal at times set by a receiver sample clock, where the frequency of the receiver sample clock may be set by a VCO at the receiver device 104. The frequency of the sample clock at the receiver device 104 may be referred to as the receiver sample frequency or sample rate (which may be denoted herein by $F_S$ in Hertz). The receiver sample rate may be selected to satisfy the Nyquist criterion for the highest anticipated transmitter symbol rate. For example, if the transmitter symbol rate is expected to be 10 GBaud, then the receiver sample rate may be set to 20 GHz. U.S. Pat. No. 7,701,842 to Roberts et al. describes using a fractional sample rate that is less than double the symbol rate. A symbol clock at the receiver device 104 may be set to be a certain ratio or fraction of the receiver sample rate and, after initial processing, the information stream may be resampled to a receiver symbol rate that is equal to the transmitter symbol rate. Herein, the term "samples" is generally used to refer to samples taken at the receiver symbol rate, or at some oversampling rate, depending upon the context.

Various elements and effects in the communication network 100 may result in the degradation of signals transmitted between different devices. Thus, a signal received at the receiver device 104 may comprise a degraded version of a signal transmitted by the transmitter device 102. For example, where the communication channel 106 is an optical communication channel, the signal transmitted by the transmitter device 102 may be degraded by polarization mode dispersion (PMD), polarization dependent loss or gain (PDL or PDG), state of polarization (SOP) rotation, amplified spontaneous emission (ASE) noise, and wavelength-dependent dispersion or chromatic dispersion (CD), and other effects. The degree of signal degradation may be characterized by signal-to-noise ratio (SNR), or alternatively by noise-to-signal ratio (NSR).

Any remaining portion of the net CD in the link that was not already compensated for by CD pre-compensation applied at the transmitter may be referred to as the residual CD, and should be compensated for by CD post-compensation applied at the receiver.

The first stages of start-up of a receiver, including clock recovery, carrier recovery, and linear equalizer training, may depend on a priori knowledge of the residual CD in the communications signal. Where the net CD of the link and the amount of CD pre-compensation applied at the transmitter are known, the residual CD may be inferred. However, where one or both of the net CD and amount of CD pre-compensation are unknown, then it may be necessary to perform measurements to estimate the residual CD.

Various techniques for estimation of the residual CD in a link are known. A common technique involves applying a filter at the receiver that is intended to invert or reverse the residual CD in the link (i.e., a CD post-compensation filter), where the filter is characterized by as-yet-undefined coefficients. According to some examples, the filter is applied while sweeping through a series of different values of the coefficients, and the values that result in a peak in the strength of the Godard clock signal (or variant thereof) are used to estimate the residual CD in the link. Examples of this technique are described by Hauske et al. in "Precise, Robust and Least Complexity CD estimation," in *Optical Fiber Communication Conference,* Paper JWA032, 2011, and by Sui et al. in "Fast and Robust Blind Chromatic Dispersion Estimation Using Auto-Correlation of Signal Power Waveform for Digital Coherent Systems," *Journal of Lightwave Technology,* Volume 31, Issue 2, 2013. The requirement to scan through multiple values of filter coefficients makes this a slow technique for CD estimation, adding significant delay to the start-up of the receiver device (also referred to as the acquisition procedure). Furthermore, the methods described by Hauske et al. and Sui et al. are sensitive to clock frequency offset between the transmitter and the receiver, and are also sensitive to fiber optical impairments such as differential group delay (DGD), SOP rotation, and PDL.

Conventional methods for estimating carrier frequency offset (CFO) rely on the insertion of synchronization symbols or pilot symbols among the data symbols conveyed by the communication signal. This is described, for example, by Magarini et al. in "Pilot-Symbols-Aided Carrier-Phase Recovery for 100-G PM-QPSK Digital Coherent Receivers," *IEEE Photonics Technology Letters,* vol. 24, no. 9, pp. 739-741, May 2012, and by Spalvieri and Barletta in "Pilot-Aided Carrier Recovery in the Presence of Phase Noise," *IEEE Transactions on Communications,* vol. 59, no. 7, pp 1966-1974, July 2011. However, the inclusion of these synchronization symbols reduces the effective data transmission rate. Furthermore, CFO estimation based on synchronization symbols may be dependent on clock recovery, as well as the equalization of various channel impairments such as CD, group delay (GD), and PMD. Consequently, using synchronization symbols to estimate CFO may not be possible during the first stages of receiver modem start-up, when the circuits are not yet functioning properly.

Figure 2:
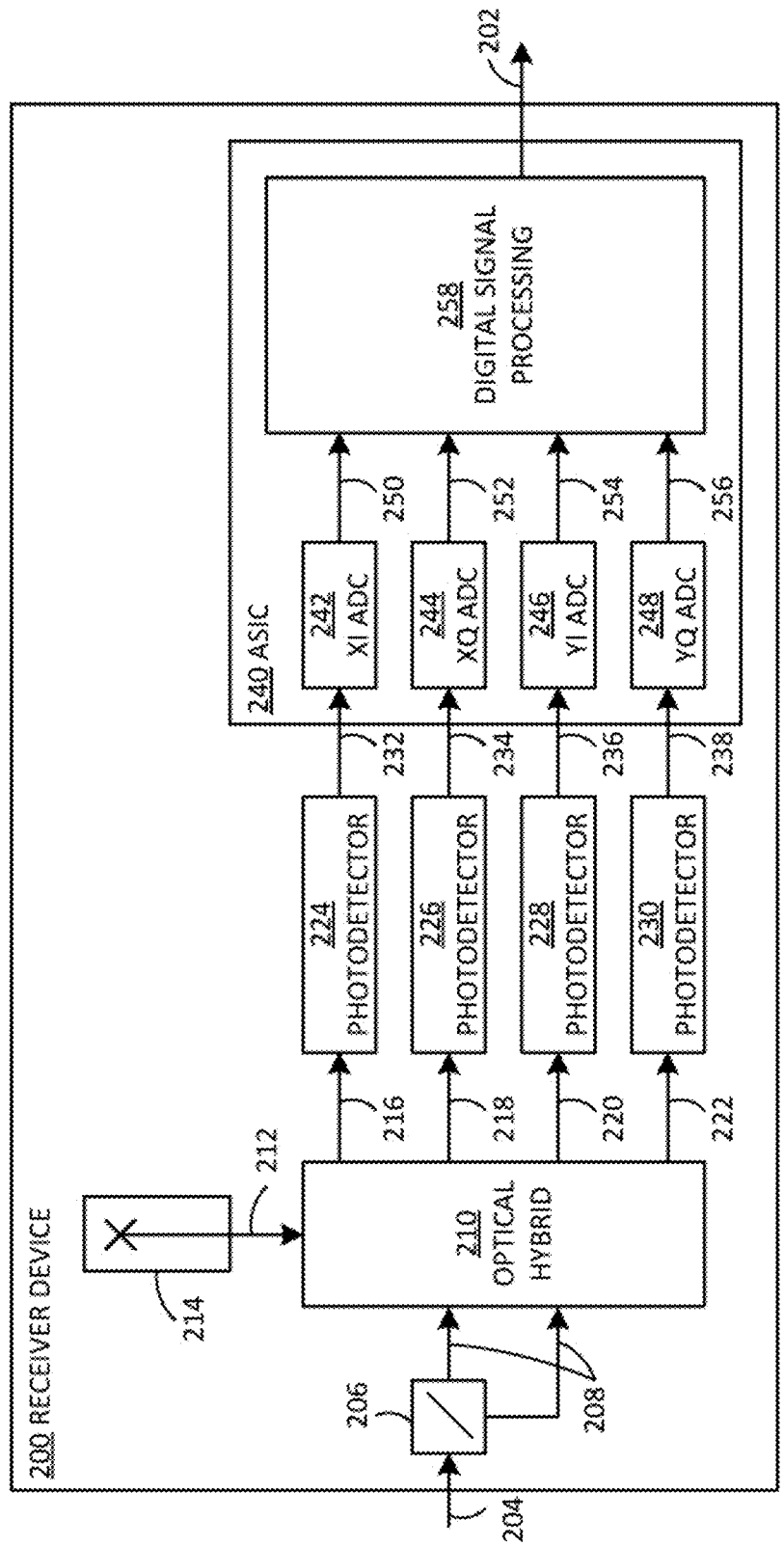
FIG. 2 illustrates an example receiver device in accordance with some examples of the technology disclosed herein.

FIG. 2 illustrates an example receiver device 200, in accordance with some examples of the technology disclosed herein. The receiver device 200 is an example of the receiver device 104. The receiver device 200 may comprise additional components that are not described in this document.

The receiver device 200 is configured to receive an optical signal 204, which may comprise a degraded version of an optical signal generated by a transmitter device, such as the transmitter device 102. According to some examples, a laser of the transmitter device may generate a continuous wave (CW) optical carrier, which is split by a polarizing beam splitter into polarized components. The polarized components may be modulated by electrical-to-optical (E/O) modulators of the transmitter device to produce modulated polarized optical signals that are combined by a beam combiner, thus yielding the optical signal. The optical signal generated by the transmitter device may be representative of information bits (also referred to as client bits) which are to be communicated to the receiver device 200. The client bits may be mapped to symbols such that optical signal is representative of a stream of symbols having a symbol rate $f_s$. According to some examples, the transmitter device may be configured to apply forward error correction (FEC) encoding to the client bits to generate FEC-encoded bits, which may then be mapped to one or more streams of data symbols. The transmitter device may be configured to apply processing to the one or more streams of symbols, including digital up-sampling of the symbols, followed by operations such as pulse shaping, FDM subcarrier multiplexing, distortion pre-compensation, and CD pre-compensation. The processing may include the application of one or more filters, which may involve the application of one or more Fast Fourier Transforms (FFTs) and one or more corresponding inverse FFTs (IFFTs). The FFT operations described throughout this document may alternatively be performed using discrete Fourier transform (DFT) operations. Similarly, the IFFT operations described throughout this document may alternatively be performed using inverse DFT (IDFT) operations.

At the receiver device 200, a polarizing beam splitter 206 is configured to split the received optical signal 204 into polarized components 208. According to one example, the polarized components 208 may comprise orthogonally polarized components corresponding to an X polarization and a Y polarization. An optical hybrid 210 is configured to process the components 208 with respect to an optical signal 212 produced by a laser 214, thereby resulting in optical signals 216, 218, 220, 222 corresponding to the dimensions XI, XQ, YI, YQ, where XI and XQ denote the in-phase and quadrature components of the X polarization, respectively, and YI and YQ denote the in-phase and quadrature components of the Y polarization, respectively. Photodetectors 224, 226, 228, 230 are configured to convert the optical signals 216, 218, 220, 222 output by the optical hybrid 210 to respective analog signals 232, 234, 236, 238. Together, elements such as the beam splitter 206, the laser 214, the optical hybrid 210 and the photodetectors 224, 226, 228, 230 may form a communication interface configured to receive optical signals from other devices in a communication network.

The receiver device 200 may comprise an application-specific integrated circuit (ASIC) 240. The ASIC 240 may comprise analog-to-digital converters (ADCs) 242, 244, 246, 248 which are configured to sample the analog signals 232, 234, 236, 238, respectively, and to generate respective digital signals 250, 252, 254, 256. Although illustrated as comprised in the ASIC 240, in an alternate implementation the ADCs 242, 244, 246, 248 or portions thereof may be separate from the ASIC 240. The ADCs 242, 244, 246, 248 sample the analog signals 232, 234, 236, 238 periodically at a sample rate, where the sample rate may be based on a signal received from a VCO at the receiver device 200 (not shown).

The ASIC 240 is configured to apply digital signal processing 258 to the digital signals 250, 252, 254, 256, which ultimately results in corrected client bits 202. In general, the processing 258 may comprise the application of one or more filters to the digital signals 250, 252, 254, 256, which may involve the application of one or more FFTs and one or more corresponding IFFTs. The processing 258 may also include down-sampling, FDM subcarrier de-multiplexing, distortion post-compensation, and CD post-compensation. The processing 258 may comprise the application of an adaptive linear equalizer to compensate for low-memory linear imperfections of the fiber, that is, any linear impairment whose time-domain impulse response is short, such as DGD, PDL, and SOP rotation. The processing 258 may further comprise clock recovery, carrier recovery, and decoding. Where the optical signal 204 is representative of symbols comprising FEC-encoded bits generated as a result of applying FEC encoding to client bits at the transmitter, the processing 258 may comprise FEC decoding to recover the corrected client bits 202.

The CD post-compensation and the carrier recovery implemented as part of the processing 258 depend on accurate estimates of residual CD and CFO, respectively. As previously noted, existing methods for estimating residual CD and CFO suffer from various limitations. In particular, the known methods for estimating residual CD and CFO may be sensitive to clock frequency offset, DGD, GD, SOP rotation, PDL, and PMD. Consequently, these methods may be unsuitable for "blind" implementation (i.e., during modem start-up, prior to compensation of various signal impairments).

This document proposes technology for blind estimation of residual CD and CFO that may avoid one or more disadvantages of existing methods. The proposed techniques may be used for "blind estimation" of residual CD and/or CFO in that they do not require any prior knowledge of transmitter signal patterns, and are independent of clock phase/frequency offset, and optionally independent of DGD, SOP rotation, and PDL. Accordingly, the techniques may be applied during the first stages of receiver modem start-up, when the DSP circuit(s) of the receiver are not yet functioning properly.

Figure 3:
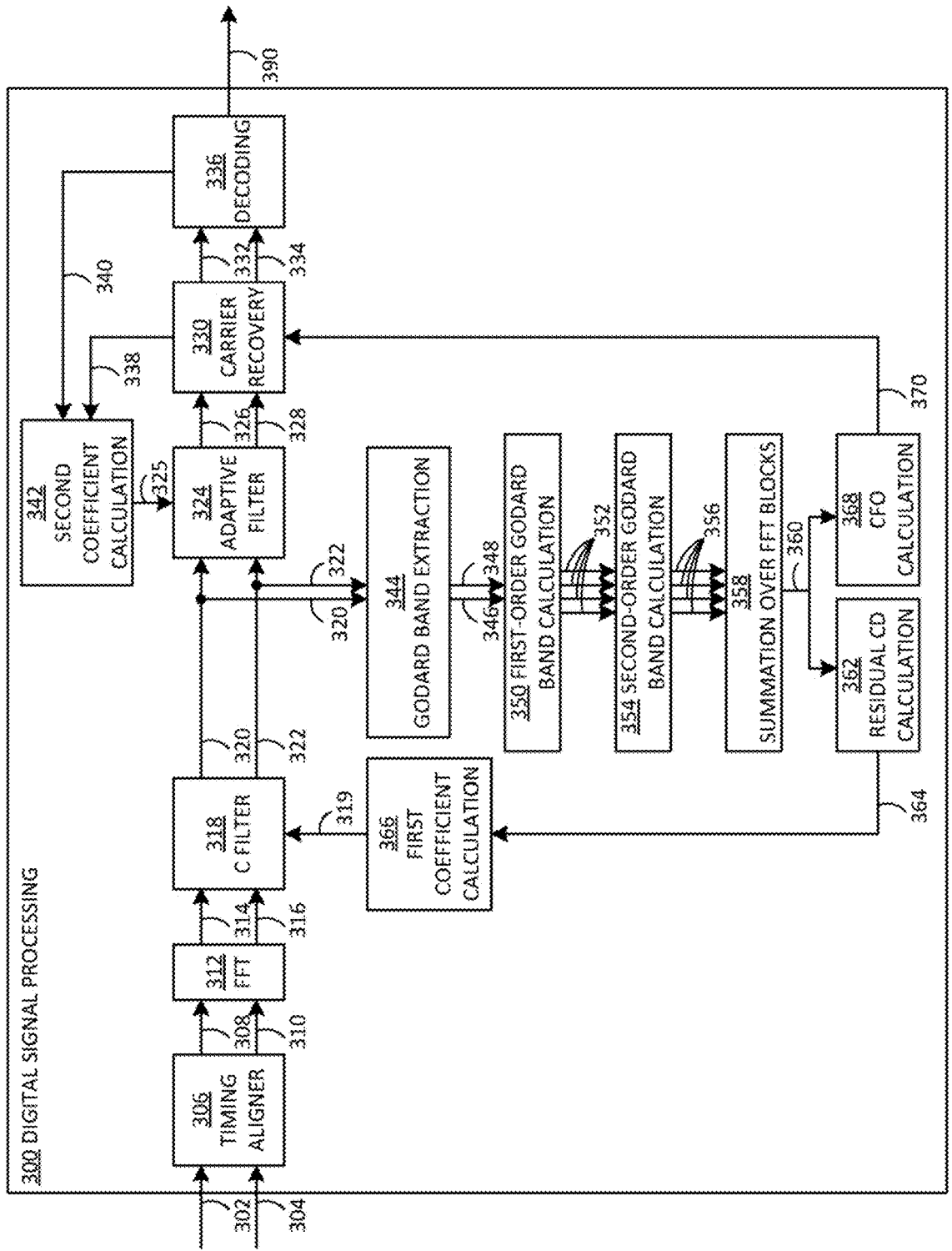
FIG. 3 illustrates example digital signal processing for blind estimation of residual chromatic dispersion (CD) and carrier frequency offset (CFO) in accordance with some examples of the technology disclosed herein.

FIG. 3 illustrates example digital signal processing 300 for blind estimation of residual CD and CFO in accordance with some examples of the technology disclosed herein. The digital signal processing 300 is an example of the digital signal processing 258.

Digital signals 302 and 304 corresponding to the X and Y polarizations are input to the digital signal processing 300. The digital signal 302 may represent, for example, the signals 250, 252 output by the ADCs 242, 244, respectively. The digital signal 304 may represent, for example, the signals 254, 256 output by the ADCs 246, 248, respectively.

A timing alignment operation 306 may be applied to the digital signals 302, 304, thereby resulting in respective signals 308, 310. According to some examples, the transmitted data is encapsulated into frames, where each frame consists of multiple slices (or blocks), and where each slice has a number of samples equivalent to the IFFT size at the transmitter and the FFT size at the receiver. At the transmitter, the slice timing may be aligned with the IFFT output. At the receiver, due to GD and DGD, the slice may not be perfectly aligned with the FFT input. The timing aligner 306 is employed to adjust the timing of each slice by an integer number of samples to the beginning of the FFT input. The timing aligner 306 may be implemented, for example, as two barrel shifters, each of which applies a different amount of adjustment on the X and Y polarizations. Although not explicitly illustrated in FIG. 3, the timing aligner 306 may be followed by an overlap-and-save (OAS) operation.

Each of the time-domain signals 308, 310 may undergo a FFT operation 312 of length N to generate respective frequency-domain signals 314, 316 corresponding to the X and Y polarizations, respectively, where N is a positive integer. According to one example, N=400. The frequency-domain signals 314, 316 are made up of FFT blocks (also referred to as slices), where each FFT block corresponds to a different time interval.

The processing 300 comprises a filter 318 (herein referred to as a "C filter") which is designed to at least partially compensate for slowly changing channel impairments, such as residual CD. Where the sample rate at the receiver satisfies the Nyquist criterion, application of a Nyquist-pulse shape has the desirable effects of achieving zero inter-symbol interference (ISI) in the time domain and minimum noise bandwidth. A well-known example of a Nyquist pulse shape is a raised cosine filter. It is common practice to split the Nyquist filter, such as the raised cosine filter, between a transmitter and receiver by applying, for example, a root-raised cosine filter at each device, also known as matched filters. For example, the C filter 318 may comprise a root-raised cosine filter that matches a root-raised cosine filter applied at the transmitter. The filter shape achieved by the filters applied at the transmitter and the receiver may be characterized by a bandwidth expansion factor $\alpha$, where $\alpha$ is a real number satisfying $0<\alpha\leq1$. The bandwidth expansion factor may be expressed as $\alpha=F_S T-1$, where $F_S$ denotes the sample rate and T denotes the symbol period. The bandwidth expansion factor $\alpha$ describes how much the signal bandwidth is expanded from a minimum signalling rate of 1/T. Raised cosine filters and root-raised cosine filters are characterized by a roll-off factor, which may or may not be equivalent to the bandwidth expansion factor $\alpha$. For example, given a bandwidth expansion factor of α=0.25=¼, a receiver may be configured to apply a root-raised cosine filter having a roll-off factor of ¼, or ⅛, or ¹⁄₁₆, depending on the pulse shaping applied at the transmitter. For ease of explanation, some examples presented in this document assume a raised cosine filter shape with a roll-off factor that is equal to the bandwidth expansion factor α. Thus, the bandwidth expansion factor a may also be referred to as the roll-off factor α. The raised cosine and root-raised cosine shapes have a substantially flat spectrum for angular frequencies ω within the range $$-\frac{\pi(1-\alpha)}{T} \leq \omega \leq \frac{\pi(1-\alpha)}{T},$$

and the spectrum "rolls off" to zero outside of that range, where the roll-off rate is dictated by the value of the roll-off factor α. As the value of the roll-off factor α approaches zero, the shape of the raised cosine (or root-raised cosine) becomes closer to a rectangle function in the frequency domain. Some filter shapes, such as a sinc shape, may not have a flat spectrum in the range $$-\frac{\pi(1-\alpha)}{T} \leq \omega \leq \frac{\pi(1-\alpha)}{T}.$$

Using either convolution in the time domain, or multiplication in the frequency domain, the C filter 318 may apply first compensation coefficients 319 to the signals 314, 316, thereby resulting in respective signals 320, 322. As will be described in more detail herein, the first compensation coefficients 319 may be calculated such that the C filter 318 at least partially compensates for the residual CD in the signals 314, 316. The C filter 318 may be referred to as "static" because the updating of the first compensation coefficients 319 may be relatively infrequent. For example, the first compensation coefficients 319 may be updated once every second, such that the C filter 318 is able to track and compensate for relatively slow changes in the channel response, such as changes in CD, which are typically at a rate on the order of <1 Hz.

The processing 300 further comprises a filter 324 (herein referred to as an "adaptive filter") which is designed to at least partially compensate for relatively fast changes in the channel response, such as SOP changes, PMD changes, PDL changes, small amounts of residual CD, and analog characteristics of the transmitter and receiver, which change at a rate on the order of kHz. For example, the adaptive filter 324 may compensate for impairments varying at a rate of approximately 100 kHz. According to some examples, the adaptive filter 324 may rely on a Least Mean Squares (LMS) feedback loop or other equalization techniques, such as adaptive Wiener filtering using a constant modulus algorithm (CMA) or an affine projection algorithm (APA) or a recursive least squares (RLS) algorithm. Techniques for LMS equalization in the frequency domain are described, for example, in U.S. Pat. No. 8,005,368 to Roberts et al., U.S. Pat. No. 8,385,747 to Roberts et al., U.S. Pat. No. 9,094,122 to Roberts et al., and U.S. Pat. No. 9,590,731 to Roberts et al.

Using either convolution in the time domain, or multiplication in the frequency domain, the adaptive filter 324 may apply second compensation coefficients 325 to the signals 320, 322, thereby resulting in respective signals 326, 328. As will be described in more detail herein, the second compensation coefficients may be calculated so as to at least partially compensate for residual impairments in the signals 320, 322. The second compensation coefficients may be periodically and incrementally adjusted so as to minimize the errors on the symbols that are currently being decoded.

A carrier recovery operation 330 may be applied to the signals 326, 328, thereby resulting in respective signals 332, 334 which are at least partially compensated for CFO. The carrier recovery operation 330 may undo the effect caused laser frequency offset between the transmitter laser and the receiver laser, such as the laser 214. The carrier recovery operation 330 may apply a phase rotation to each symbol in the signals 326, 328, where the amount of phase rotation applied may be linearly increased or decreased from symbol to symbol. Although not shown in FIG. 3, the signals 326, 328 may undergo additional operations such as downsampling and IFFT and discard prior to the carrier recovery operation 330.

A decision circuit may apply a decoding operation 336 to the signals 332, 334 to recover bit estimates which are represented by signal 390. According to some examples, the decoding operation 336 may comprise soft decoding. Although not explicitly illustrated, the signal 390 may subsequently undergo FEC decoding.

The second compensation coefficients 325 applied by the adaptive filter 324 may be calculated using an adaptive coefficient calculation operation 342 which is dependent on feedback from the carrier recovery operation 330 and feedback from the decoding operation 336, as denoted by feedback signals 338, 340, respectively. For example, in the case of LMS equalization, the signal 338 generated by the carrier recovery operation 330 may be representative of signals that have been at least partially compensated for laser frequency offset and linewidth, while the signal 340 generated by the decoding operation 336 may be representative of symbol estimates (corresponding to the bit estimates represented by signal 390). The adaptive coefficient calculation 342 may include a calculation of the difference between the signals 338 and 340 (i.e., calculation of an error), and calculations that result in second coefficients 325 that are designed to reduce to this error in a subsequent time interval.

Figure 4:
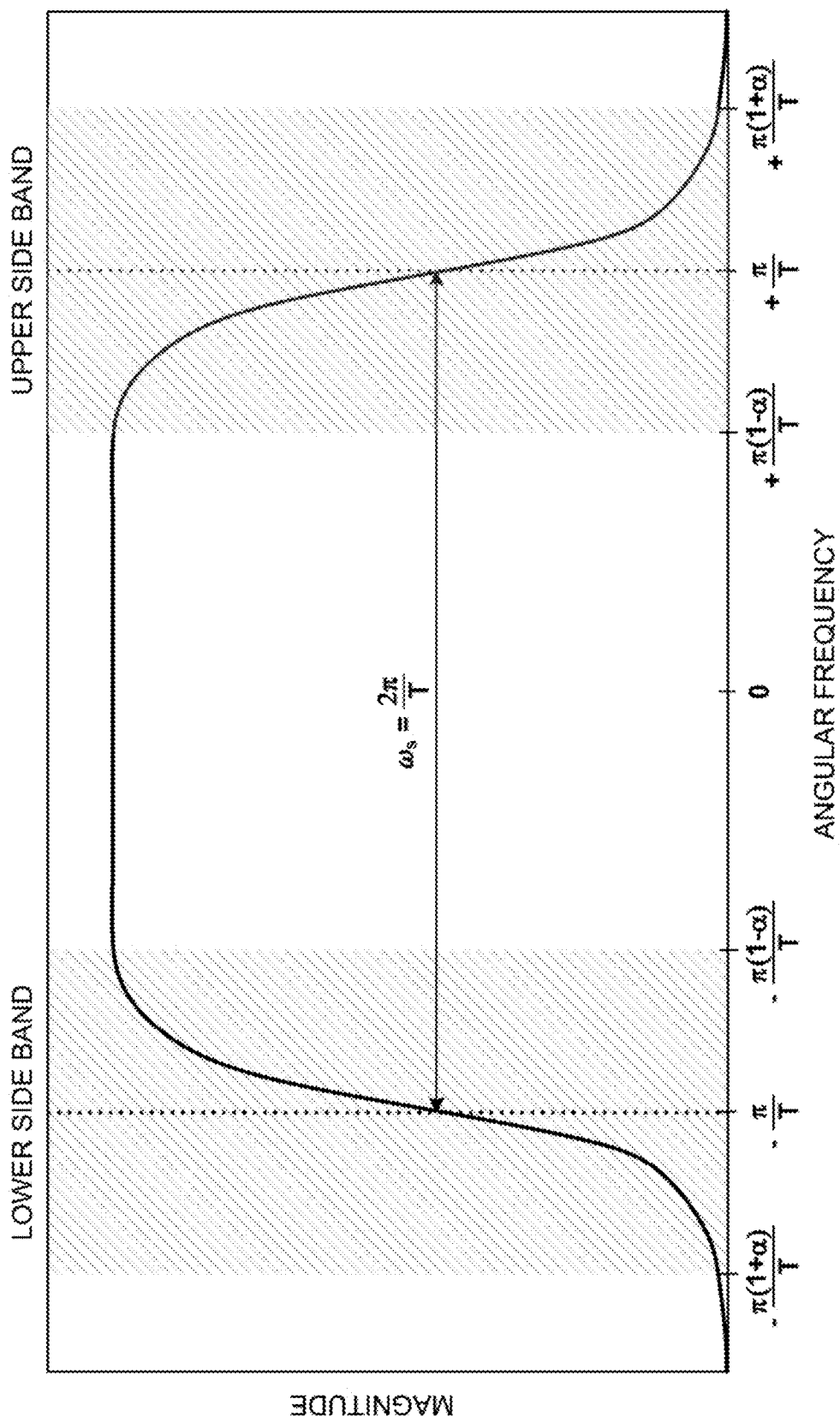
FIG. 4 illustrates a frequency spectrum of a communications signal in accordance with some examples of the technology disclosed herein.

FIG. 4 illustrates an example representation of a single polarization of a communications signal in the frequency domain following the application of a C filter. For example, the plot in FIG. 4 may represent the signal 320 (or the signal 322) following the application of the C filter 318. As previously described, in some examples the C filter 318 may comprise a root-raised cosine filter that matches a root-raised cosine filter applied at the transmitter. When plotted in the frequency domain, as illustrated in FIG. 4, the C-filtered signal comprises a lower side band and an upper side band. The lower side band is defined by those angular frequencies ω within the range $$\omega = -\frac{\pi(1+\alpha)}{T} \ldots -\frac{\pi(1-\alpha)}{T},$$

while the upper side band is defined by those angular frequencies ω within the range $$\omega = +\frac{\pi(1-\alpha)}{T} \ldots +\frac{\pi(1+\alpha)}{T},$$

where T denotes the symbol period, and where α denotes the bandwidth expansion factor, which is equivalent to the roll-off factor in this example. Collectively, the lower side band and the upper side band may be referred to as the Godard band (or alternatively the zeroth-order Godard band). The centres of the two side bands are separated by an angular symbol frequency $$\omega_s = \frac{2\pi}{T}.$$

FIG. 4 represents the magnitude of one polarization of a C-filtered signal as a function of angular frequency ω for a single time interval. In the case of a dual-polarization communications signal, the amplitude of the X polarization may be denoted by $X(\omega)$, the amplitude of the Y polarization may be denoted by $Y(\omega)$, and the received optical field may be expressed as $$\vec{R}(\omega) = \begin{bmatrix} X(\omega) \\ Y(\omega) \end{bmatrix}.$$

A plurality of instantaneous Godard correlation matrices may be defined over a range of angular frequencies $$-\frac{\pi}{T}(1+\alpha) \leq \omega \leq -\frac{\pi}{T}(1-\alpha)$$

as follows:

$$G(\omega) = \vec{R}(\omega)\vec{R}^H\left(\omega + \frac{2\pi}{T}\right),\quad [1]$$

where $G(\omega)$ denotes a 2×2 matrix, where $\vec{R}(\omega)$ denotes the received optical field over the X and Y polarizations, where the superscript H denotes Hermitian conjugation, and where T denotes the symbol period. Thus, each instantaneous Godard correlation matrix is defined by multiplying first components in the lower side band with the Hermitian conjugate of second components in the upper side band, where the second components are separated from the first components by the angular symbol frequency ωS. Collectively, the plurality of instantaneous Godard correlation matrices may herein be referred to as the first-order Godard band. The information contained in the first-order Godard band may be used for clock phase detection, for example, as described by Godard in "Passband timing recovery in an all-digital modem receiver," IEEE Trans. Commun. 26(5), 517-523, 1978.

Provided that root-raised cosine matched filtering is used at the transmitter and the receiver, Equation 1 may be expressed as $$G(\omega) = g(\omega)g *\left(\omega + \frac{2\pi}{T}\right) \cdot T(\omega)T^H\left(\omega + \frac{2\pi}{T}\right),\quad [2]$$

where $g(\omega) = r\cos(\omega) \cdot \exp(j\phi(\omega))$ where "r cos" denotes a raised cosine function, where $\phi(\omega)$ denotes a frequency-dependent phase function, where the superscript * denotes complex conjugation, and where $T(\omega)$ is a 2×2 matrix denoting the multiple-input multiple-output (MIMO) channel response at the angular frequency ω. The assumption that $g(\omega)$ has the raised cosine shape r cos (ω) is reasonable, since the magnitude of the CFO is typically small.

The phase function $\phi(\omega)$, which is also denoted by $\angle g(\omega)$, may be expressed as $$\phi(\omega) = \left(\beta_0 + \beta_1\omega + \frac{\beta_2}{2}\omega^2 + \frac{\beta_3}{6}\omega^3 + \ldots\right),\quad [3]$$

where $\beta_0$ denotes a zeroth-order phase term indicative of a phase error due to the fact that the transmitter and the receiver are not typically phase-locked, where $\beta_1$ denotes a first-order phase term indicative of overall timing phase/temporal delay (caused, for example, by C filter delay, GD, DGD, and clock slip), where $\beta_2$ denotes a second-order phase term indicative of residual CD, and where $\beta_3$ denotes a third-order phase term indicative of higher-order residual CD. According to some examples, clock recovery may be achieved based on an estimate of $\beta_1$, and CD compensation may be achieved based, at least in part, on an estimate of $\beta_2$. In the event that the third-order phase term $\beta_3$ is significant relative to $\beta_2$, CD compensation may additionally be achieved based on an estimate of $\beta_3$.

Given the characteristics of the phase function $\phi(\omega)$ as expressed in Equation 3, it may be shown that the phase terms $\beta_0$, $\beta_1$, $\beta_2$, and $\beta_3$ are obtainable using a series of derivative calculations with back-substitutions. For example, a calculation of the third-order derivative of the phase function $\phi(\omega)$ that is $$\frac{\partial^3 \phi(\omega)}{\partial \omega^3},$$

may be used to obtain an estimate of the third-order phase term $\beta_3$. In addition, a calculation of the second-order derivative of the phase function $\phi(\omega)$ that is $$\frac{\partial^2 \phi(\omega)}{\partial \omega^2},$$

may be used together with a back-substitution of the estimate of $\beta_3$ to obtain an estimate of the second-order phase term $\beta_2$. In addition, a calculation of the first-order derivative of the phase function $\phi(\omega)$, that is $$\frac{\partial \phi(\omega)}{\partial \omega},$$

may be used together with back-substitutions of the estimates of $\beta_3$ and $\beta_2$ to obtain an estimate of the first-order phase term $\beta_1$. Finally, back-substitutions of the estimates of $\beta_3$, $\beta_2$, and $\beta_1$ into Equation 3 may be used to obtain an estimate of the zeroth-order phase term $\beta_0$.

For each one of the phase terms $\beta_3$, $\beta_2$, $\beta_1$, and $\beta_0$, a plurality of unique estimates may be calculated at a respective plurality of angular frequencies ω within a frequency band of interest, such as the band $$-\frac{\pi}{T}(1+\alpha) \leq \omega \leq -\frac{\pi}{T}(1-\alpha)$$

over which the first-order Godard band is defined. The plurality of unique phase term estimates may be averaged to obtain an average estimate. For example, the average estimate of the third-order phase term $\beta_3$ over a range of angular frequencies $\omega_a \leq \omega \leq \omega_b$ may be obtained using integration as follows:

$$\beta_3 = \frac{1}{\omega_b - \omega_a} \int_{\omega_a}^{\omega_b} d\omega \frac{\partial^3 \phi(\omega)}{\partial \omega^3}. \qquad [4]$$

The technique of using phase derivatives to estimate the phase terms $\beta_3$, $\beta_2$, $\beta_1$, and $\beta_0$ may be implemented in the discrete frequency domain using correlation of complex samples and summation over frequency bins, as will now be described. In the following examples, X[n, k] denotes the amplitude of the X polarization of the C-filtered signal at the $n^{th}$ frequency bin and the $k^{th}$ FFT block, while Y[n, k] denotes the amplitude of the Y polarization of the C-filtered signal at the $n^{th}$ frequency bin and the $k^{th}$ FFT block, where n and k are integers. Referring to the C-filtered signals 320 and 322, the index n satisfies n $\in \{0, 1, \ldots, N-1\}$, and where N denotes the size of the FFT operation 312.

Referring again to FIG. 3, an operation 344 may be applied to the signals 320, 322 to extract those portions of the signals 320, 322 that are within the Godard band. The resulting signals 346, 348 are collectively referred to as the Godard band components (or zeroth-order Godard band components), and, at the $k^{th}$ FFT block, are expressed as $$G_{0,x}[n, k] = X\left[n + \frac{N}{2} - N_g, k\right] \qquad [5]$$

$$G_{0,y}[n, k] = Y\left[n + \frac{N}{2} - N_g, k\right],$$

where n $\in \{0, 1, \ldots, 2N_g - 1\}$, where $2N_g$ denotes the size of the extracted Godard band, where $$N_g = \frac{(L-1)N}{L},$$

where N denotes the FFT size, and where L is a real number greater than one (L>1) which denotes an up-sampling factor. The up-sampling factor L is related to the bandwidth expansion factor $\alpha$ according to L=$\alpha$+1.

The signals $G_{0,x}[n,k]$, $G_{0,y}[n,k]$ may be respectively referred to as the X polarization components of the Godard band and the Y polarization components of the Godard band. Provided that root-raised cosine matched filtering is used at the transmitter and the receiver, each polarization of the Godard band is expected to have a raised cosine shape with an envelope $R_0[n]$ expressed as $$R_0[n] = E\{|G_{0,x}[n, k]|\} = E\{|G_{0,y}[n, k]|\} = \frac{1}{2}\left(1 + \cos\left(\frac{\pi n}{N_g}\right)\right), \qquad [6]$$

where E{} denotes the expectation value, and where n $\in \{0, 1, \ldots, 2N_g - 1\}$.

Figure 5:
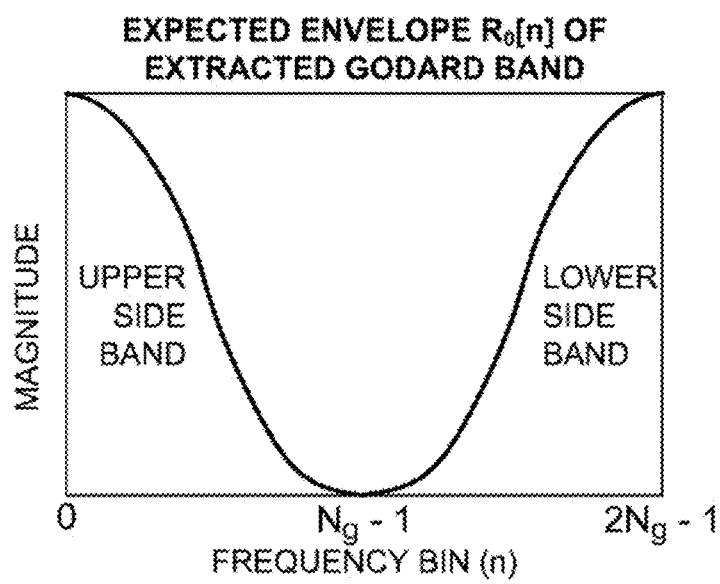
FIG. 5 illustrates an expected envelope of an extracted Godard band in accordance with some examples of the technology disclosed herein.

FIG. 5 illustrates an example plot of the expected envelope $R_0[n]$ of the extracted Godard band.

Returning to FIG. 3, the extracted Godard band signals 346, 348 may undergo a first-order Godard band calculation 350, thereby resulting in signals 352 which are representative of four first-order correlation signals $G_{1,xx}[n,k]$, $G_{1,xy}[n,k]$, $G_{1,yx}[n,k]$, $G_{1,yy}[n,k]$. The first-order correlation signals 352 are collectively referred to as the first-order Godard band components, and, at the $k^{th}$ FFT block, are expressed as $$G_{1,xx}[n, k] = G_{0,x}[n, k]G_{0,x}^*[n + N_g, k] \qquad [7]$$

$$G_{1,xy}[n, k] = G_{0,x}[n, k]G_{0,y}^*[n + N_g, k]$$

$$G_{1,yx}[n, k] = G_{0,y}[n, k]G_{0,x}^*[n + N_g, k]$$

$$G_{1,yy}[n, k] = G_{0,y}[n, k]G_{0,y}^*[n + N_g, k],$$

where n $\in \{0, 1, \ldots, N_g 1\}$, and where the superscript * denotes complex conjugation. The first-order Godard band components are equivalent to a phase derivative of the extracted Godard band components at a first differential distance $\Delta_1 = N_g$.

An expected envelope $R_1[n]$ for each one of the first-order correlation signals in Equation 7 may be expressed as $$R_1[n] = R_0[n]R_0[n + N_g] = \frac{1}{8}\left(1 - \cos\left(\frac{2\pi n}{N_g}\right)\right), \qquad [8]$$

where $R_0[n]$ is defined in Equation 6, and where n $\in \{0, 1, \ldots, N_g - 1\}$. Thus, the envelope of the first-order Godard band components represented by the signals 352 follow a raised cosine response with $\alpha$=1.

Figure 6:
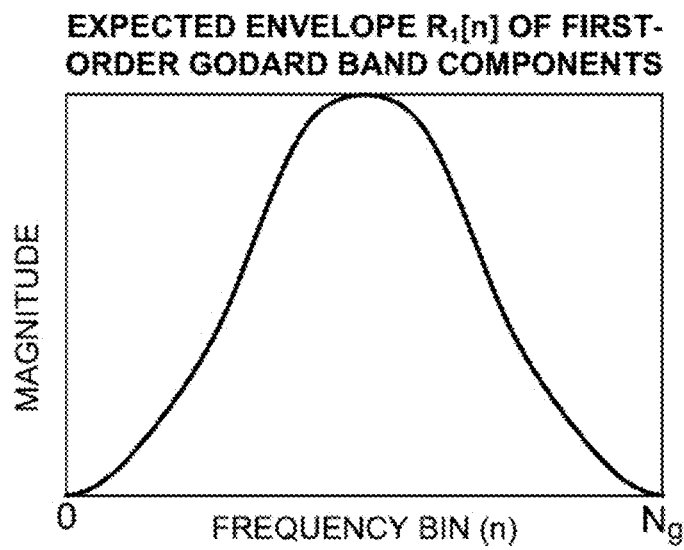
FIG. 6 illustrates an expected envelope of first-order Godard band components in accordance with some examples of the technology disclosed herein.

FIG. 6 illustrates an example plot of the expected envelope $R_1[n]$ the first-order Godard band components.

The phase $\phi_{1,xx}[n,k]$ of the first-order correlation signal $G_{1,xx}[n,k]$, which is also denoted by $\angle G_{1,xx}[n,k]$, may be expressed in radians as $$\phi_{1,xx}[n, k] = \theta_{1,xx} + \left(\beta_2 \frac{2\pi}{L} + \beta_3 \left(\frac{2\pi}{L}\right)^2\right)\omega_n + \beta_3 \frac{2\pi}{L}\omega_n^2, \qquad [9]$$

where n $\in \{0, 1, \ldots, N_g - 1\}$, where $\theta_{1,xx}$ denotes a frequency-independent phase amount that is a function $\alpha$, $\beta_1$, $\beta_2$, $\beta_3$, and where $\omega_n$ denotes the discrete angular frequency in units of radians per cycle, which is expressed as $$\omega_n = \begin{cases} \frac{2\pi n}{N}, & \text{if } n < \frac{N}{2} \\ \frac{2\pi(n-N)}{N}, & \text{otherwise} \end{cases}. \qquad [10]$$

As a result of performing a first-order phase derivative on the extracted Godard band components, $\phi_{1,xx}[n,k]$ is not dependent on the zeroth-order phase term $\beta_0$. However, as is apparent from Equation 9, the phase $\phi_{1,xx}[n,k]$ has a quadratic dependency on the frequency $\omega_n$. Additionally, the value of $\theta_{1,xx}$ may vary from block to block due to PMD and clock slip. Corresponding expressions to that of Equation 9 may be derived for each of the phases $\phi_{1,xy}[n,k]$, $\phi_{1,yx}[n,k]$, and $\phi_{1,yy}[n,k]$ of the first-order correlation signals $G_{1,xy}[n,k]$, $G_{1,yx}[n,k]$, and $G_{1,yy}[n,k]$, respectively.

Returning to FIG. 3, the signals 352 representing the first-order Godard band components may undergo a second-order Godard band calculation 354 comprising the calculation of four second-order correlation signals 356 denoted by $G_{2,xx}[n, k]$, $G_{2,xy}[n, k]$, $G_{2,yx}[n, k]$, $G_{2,yy}[n, k]$. The second-order correlation signals 356 are collectively referred to as the second-order Godard band components, and, at the $k^{th}$ FFT block, are expressed as $$G_{2,xx}[n, k] = G_{1,xx}[n, k]G_{1,xx}^*[n + \Delta_2, k] \quad [11]$$

$$G_{2,xy}[n, k] = G_{1,xy}[n, k]G_{1,xy}^*[n + \Delta_2, k]$$

$$G_{2,yx}[n, k] = G_{1,yx}[n, k]G_{1,yx}^*[n + \Delta_2, k]$$

$$G_{2,yy}[n, k] = G_{1,yy}[n, k]G_{1,yy}^*[n + \Delta_2, k],$$

where $n \in \{0, 1, \ldots, N_g-\Delta_2-1\}$ where $\Delta_2$ is a positive integer, and where the superscript * denotes complex conjugation. The phase term of the second-order Godard band components are equivalent to a phase derivative of the first-order Godard band components at a second differential distance equal to $\Delta_2$.

An expected envelope $R_2[n]$ for each one of the second-order correlation signals in Equation 11 may be expressed as $$R_2[n]=R_1[n]R_1[n+\Delta_2], \quad [12]$$

where $R_1[n]$ is defined in Equation 8, and where $n \in \{0, 1, \ldots, N_g-\Delta_2-1\}$.

Figure 7:
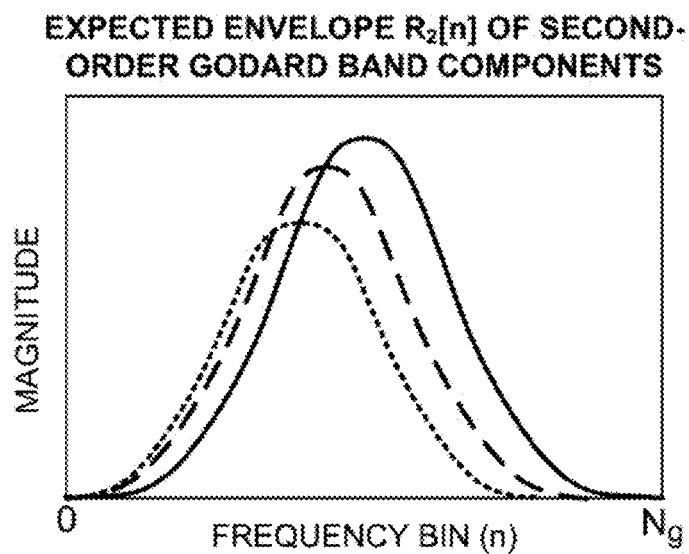
FIG. 7 illustrates three examples of an expected envelope of second-order Godard band components in accordance with some examples of the technology disclosed herein.

FIG. 7 illustrates an example plot of the expected envelope $R_2[n]$ of the second-order Godard band components obtained using three different values for the second differential distance, namely $\Delta_2=1$, $\Delta_2=10$, and $\Delta_2=20$.

The phase $\phi_{2,xx}[n, k]$ of the second-order correlation signal $G_{2,xx}[n, k]$, which is also denoted by $\angle G_{2,xx}[n, k]$, may be expressed in radians as $$\phi_{2,xx}[n, k] = -\beta_2 \frac{4\pi^2 \Delta_2}{LN} - \beta_3 \frac{8\pi^3 \Delta_2}{LN}\left(\frac{1}{L} - \frac{\Delta_2}{N}\right) - \beta_3 \frac{4\pi^2 \Delta_2}{LN}\omega_n, \quad [13]$$

where $n \in \{0, 1, \ldots, N_g-\Delta_2-1\}$, and where $\omega_n$ denotes the discrete angular frequency term expressed in Equation 10.

A comparison of Equations 9 and 13 demonstrates that, unlike the phase $\phi_{1,xx}[n, k]$ of the first-order correlation signal $G_{1,xx}[n, k]$, the phase $\phi_{2,xx}[n,k]$ of the second-order correlation signal $G_{2,xx}[n, k]$ is independent of the first-order phase term $\beta_1$. Accordingly, it may be shown that the phases $\phi_{2,xx}[n, k]$, $\phi_{2,xy}[n, k]$, $\phi_{2,yy}[n, k]$ of the respective second-order correlation signals $G_{2,xx}[n, k]$, $G_{2,xy}[n, k]$, $G_{2,yx}[n, k]$, $G_{2,yy}[n,k]$ are identical to one another, and are insensitive to both DGD and clock slip, as well as the temporal delay reflected by the phase terms $\beta_0$ and $\beta_1$. It follows that the four second-order correlation signals may be accumulated as a running average over time to generate composite second-order Godard band components denoted by $G_2[n]$ which may be expressed as $$G_2[n]=\Sigma_k(G_{2,xx}[n, k]+G_{2,xy}[n, k]+G_{2,yx}[n, k]+G_{2,yy}[n, k]), \quad [14]$$

where $\Sigma_k$ denotes summation over a plurality of FFT blocks, and where $n \in \{0, 1, \ldots, N_g-\Delta_2-1\}$. Averaging over multiple FFT blocks using the summation operation $\Sigma_k$ may mitigate noise in the composite second-order Godard band components $G_2[n]$. According to some examples, the averaging may be performed over 500-1000 FFT blocks. In FIG. 3, this averaging is implemented by applying a summation operation 358 to the signals 356, thereby resulting in a signal 360 which represents the composite second-order Godard band components $G_2[n]$. According to some examples, $G_2[n]$ may be stored in firmware.

It is noted that the phase $\phi_{2,xx}[n, k]$ expressed in Equation 13 (which, as discussed, is the same as the phases $\phi_{2,xy}[n, k]$, $\phi_{2,yx}[n, k]$, $\phi_{2,yy}[n, k]$ has a linear dependency on the angular frequency $\omega_n$. It is contemplated that this linear dependency may be exploited to obtain an estimate of the third-order phase term $\beta_3$.

From Equations 11, 12, and 13, it may be shown that the composite second-order Godard band components $G_2[n]$ may be expressed as $$G_2[n]=R_2[n]\exp(j(\gamma_2+\gamma_3\omega_n)),$$

where $\omega_n$ denotes the discrete angular frequency defined in Equation 10, where $\gamma_2$ denotes an amount of residual dispersion expressed as $$\gamma_2 = -\beta_2\frac{4\pi^2\Delta_2}{LN} - \beta_3\frac{8\pi^3\Delta_2}{LN}\left(\frac{1}{L} - \frac{\Delta_2}{N}\right), \quad [16]$$

and where $\gamma_3$ denotes a dispersion slope expressed as $$\gamma_3 = -\beta_3\frac{4\pi^2\Delta_2}{LN}. \quad [17]$$

As illustrated in FIG. 3, a residual CD calculation 362 may be performed on the signal 360 representing the composite second-order Godard band components $G_2[n]$. According to one example, the residual CD calculation 362 may comprise using the signal 360 to calculate third-order correlation signals $G_3[n]$, referred to as the third-order Godard band components, and expressed as $$G_3[n]=G_2[n]G_2[n+\Delta_3],$$

where $n \in \{0, 1, \ldots, N_g-\Delta_2-\Delta_3-1\}$, where $\Delta_2$ and $\Delta_3$ are positive integers, and where the superscript * denotes complex conjugation. The phase of the third-order Godard band components $G_3[n]$ is equivalent to a phase derivative of the composite second-order Godard band components $G_2[n]$ at a third differential distance equal to $\Delta_3$.

The phase $\phi_3[n, k]$ of the third-order correlation signal $G_3[n]$, which is also denoted by $\angle G_3[n, k]=\angle H_3[n]$, may be expressed in radians as $$\phi_3[n, k] = \phi_{2,xx}[n, k] - \phi_{2,xx}[n + \Delta_3, k] = \quad [19]$$

$$-\beta_3\frac{4\pi^2\Delta_2}{LN}\omega_n + \beta_3\frac{4\pi^2\Delta_2}{LN}\left(\omega_n - \frac{2\pi\Delta_3}{N}\right) = -\beta_3\frac{8\pi^3\Delta_2\Delta_3}{LN^2}$$

It follows that an estimate of the third-order phase term $\beta_3$ calculable from the phase of the average of the third-order Godard band components $G_3[n]$ according to the following expression:

$$\beta_3 = -\frac{LN^2}{8\pi^3\Delta_2\Delta_3}\angle\sum_n G_3[n], \quad [20]$$

where $\Sigma_n$ denotes a summation over all the frequency bins satisfying n $\in\{0, 1, \ldots, N_g-\Delta_2-\Delta_3-1\}$. Averaging over the frequency bins using the summation operation $\Sigma_n$ may reduce the noise in the estimate of $\beta_3$.

According to another example, an estimate of $\beta_3$ may be obtained by calculating the location of a peak of the inverse Fourier transform of the signal 360. The size of the IFFT for obtaining an estimate of $\beta_3$ does not need to be same as the size of $G_2[n]$. In particular, an M-point IFFT of the composite second-order Godard band $G_2[n]$ may be expressed as $$g_2[m] = \sum_n G_2[n]\exp\left\{j\frac{2\pi mn}{M}\right\} = \sum_n R_2[n]\phi_2[n]\exp\left\{j\frac{2\pi mn}{M}\right\} = \exp\left\{-j\beta_2\frac{4\pi^2\Delta_2}{LN} - j\beta_3\frac{8\pi^3\Delta_2}{LN}\left(\frac{1}{L} - \frac{\Delta_2}{N}\right)\right\} \sum_n R_2[n]\exp\left\{-j\beta_3\frac{4\pi^2\Delta_2}{LN}\frac{2\pi n}{N} + j\frac{2\pi mn}{M}\right\} \quad [21]$$

where m denotes a timing bin or index satisfying m $\in\{0, 1, \ldots, M-1\}$.

It may be shown that the peak magnitude of $g_2[m]$ is achieved when all of the components inside the summation are phase correlated, meaning that the phase term inside the summation is close to zero for all values of n. This condition is expressed as $$-\beta_3\frac{4\pi^2\Delta_2}{LN} + \frac{m_{peak}}{M} \approx 0, \forall n \quad [22]$$

where $m_{peak}$ denotes the value of m at which the magnitude of $g_2[m]$ is at its peak.

Thus, by rearranging Equation 22, it is possible to calculate an estimate of the third-order phase term $\beta_3$ as follows $$\beta_3 \approx \frac{LN m_{peak}}{4\pi^2\Delta_2 M}. \quad [23]$$

In other words, an estimate of the residual CD may be calculated using the timing bin, $m_{peak}$, that corresponds to a peak magnitude of the inverse Fourier transform of the composite second-order Godard band components, $g_2[m]$.

Given the estimate of the third-order phase term $\beta_3$, an estimate of the dispersion slope S in units of ps/nm² may be calculated according to the following expression:

$$S = \beta_3\frac{4\pi^2 c^2}{\lambda^4}\frac{1e3}{F_S^3}, \quad [24]$$

where c=299792458 m/s denotes the speed of light in a vacuum, where $\lambda$ denotes wavelength in nm, and where $F_S$ denotes the signal sampling rate in Giga-samples per second (Gsps). Equation 24 represents a scaling of $\beta_3$ into easier-to-understand units of ps/nm². Additional conversion equations involving $\beta_2$ and $\beta_3$ are described, for example, by Asvial and Paramitha in "Analysis of high order dispersion and nonlinear effects in fiber optic transmission with Non Linear Schrodinger Equation model," 2015 *International Conference on Quality in Research (QiR)*, 2015. The estimate of the third-order phase term $\beta'$ may be back-substituted into Equation 13, yielding $$\hat{\Phi}_{2,xx}[n, k] = \phi_{2,xx}[n, k] + \beta_3\frac{8\pi^3\Delta_2}{LN}\left(\frac{1}{L} - \frac{\Delta_2}{N}\right) + \beta_3\frac{4\pi^2\Delta_2}{LN}\omega_n = -\beta_2\frac{4\pi^2\Delta_2}{LN} \quad [25]$$

from which an estimate of the second-order phase term $\beta_2$ may be calculated according to the expression $$\beta_2 = -\frac{LN}{4\pi^2\Delta_2} \angle \sum_n G_2[n]\exp\left(j\beta_3\frac{8\pi^3\Delta_2}{LN}\left(\frac{1}{L} - \frac{\Delta_2}{N}\right) + j\beta_3\frac{4\pi^2\Delta_2}{LN}\omega_n\right), \quad [26]$$

where $\Sigma_n$ denotes a summation over all the frequency bins satisfying n $\in\{0, 1, \ldots, N_g-\Delta_2-1\}$. Referring to FIG. 3, the residual CD calculation 362 may include calculating estimates of the third-order phase term $\beta_3$ and the second-order phase term $\beta_2$. Both $\beta_2$ and $\beta_3$ constitute estimates of residual CD.

According to Roberts et al. in "Performance of Dual-Polarization QPSK for Optical Transport Systems", in *Journal of Lightwave Technology*, Vol. 27, No. 16, pp. 3546-3559, Aug. 15, 2009, the amount of residual dispersion in units of ps/nm, herein denoted by D, may be calculated from the second-order phase term $\beta_2$ according to the expression $$D = \beta_2\frac{2\pi c}{\lambda^2}\frac{1e3}{F_S^2}. \quad [27]$$

The estimates of the third-order phase term $\beta_3$ and the second-order phase term $\beta_2$ may be used to calculate updated first coefficients according to $$C_{new}[n] = C_{old}[n]\exp\left(-j\frac{\beta_2}{2}\omega_n^2 - j\frac{\beta_3}{6}\omega_n^3\right), \quad [28]$$

where $C_{new}[n]$ denotes the first coefficients to be used by the C filter at a current time interval, where $C_{old}[n]$ denotes the first coefficients used by the C filter at a preceding time interval, and where n $\in\{0, 1, \ldots, N-1\}$. Referring to FIG. 3, the $\beta_2$ and $\beta_3$ estimates may be represented by a signal 364 which is used by a first coefficient calculation operation 366 to generate the first coefficients 319 to be applied by the C filter 318 at the current time interval (i.e., $C_{new}[n]$).

In the event of significant amounts of higher-order dispersion, the same logic may be used to estimate higher-order phase terms (such as $\beta_4$, $\beta_5$, etc.) by calculating higher-order Godard bands.

Where the range of the detected angle is $[-\pi, +\pi)$, Equation 26 indicates that the maximum magnitude of $\beta_2$ that may be calculated is $$\beta_{2,max} = \frac{LN}{4\pi\Delta_2}.$$

It follows that the maximum amount of residual dispersion, $D_{max}$, that may be detected and compensated for in units of ps/nm may be expressed as $$D_{max} = \beta_{2,max} \frac{2\pi c}{\lambda^2} \frac{1e3}{F_s^2} = \frac{LNc1e3}{2\Delta_2 \lambda^2 F_s^2}. \quad [29]$$

An example application is considered involving 400 Gbps optical transmission with $\alpha=0.25$ and $F_S=75$ GHz. Under these circumstances, selecting $\Delta_2=2$ would result in a maximum detectable residual dispersion of $D_{max}=2773$ ps/nm. Since this particular application is expected to have a residual dispersion D of less than 2400 ps/nm, the choice of $\Delta_2=2$ is sufficient.

For applications where the residual dispersion is relatively small, a larger value of $\Delta_2$ may be used to obtain a more accurate estimate of $\beta_2$. The optimal value of $\Delta_2$ is one that maximizes the SNR of $\beta_2$ as expressed in Equation 26. Assuming that the residual dispersion D is not high enough to cause the phase of the composite second-order Godard band components $G_2[n]$ to roll over (i.e., because the angle is outside of the range $[-\pi,+\pi)$), the signal power of the phase is proportional to $(\Delta_2)^2$, as shown in Equation 13 (where the amplitude of $\phi_{2,xx}[n, k]$ is proportional to $\Delta_2$). According to Berscheid in "FPGA-Based DOCSIS Upstream Demodulation, Section 4.4.2, Phase noise model", University of Saskatchewan, 2011, the noise power may be shown to be proportional to the NSR of $G_2[n]$, which is expressed as $$NSR = \frac{(N_g - \Delta_2)N_0}{\left(\sum_n R_2[n]\right)^2}, \quad [30]$$

where $\Sigma_n$ denotes a summation over all the frequency bins satisfying $n \in \{0, 1, \ldots, N_g-\Delta_2-1\}$, and where $N_0$ is a positive real number that denotes the noise power spectral density. This expression derives from the fact that the summation in Equation 26 increases the noise power by a factor of $(N_g-\Delta_2)$, which is equal to the amount of elements in the summation, while the signal power is increased by a factor of $(\Sigma_n R_2[n])^2$, since all the elements of $G_2[n]$ have the same phase angle.

It follows that an optimized value of $\Delta_2$ may be determined by maximizing a cost function $C(\Delta_2)$ expressed as $$C(\Delta_2) = \frac{(\Delta_2)^2 \left(\sum_n R_2[n]\right)^2}{N_g - \Delta_2}, \quad [31]$$

where $\Sigma_n$ denotes a summation over all the frequency bins satisfying $n \in \{0, 1, \ldots, N_g-\Delta_2-1\}$.

For the 400-Gbps application, it may be shown that the cost function $C(\Delta_2)$ is maximized when $\Delta_2=24$. However, according to Equation 28, using this value for $\Delta_2$ would result in a maximum detectable residual dispersion of $D_{max}=231$ ps/nm, which may be insufficient for this application.

According to some examples, the C filter may initially be configured to use coefficients calculated from a first estimate $\beta_{2,1}$ that was obtained using a low value of $\Delta_2$. For example, the first estimate $\beta_{2,1}$ may be calculated using Equation 24 with $\Delta_2=2$, where $G_2[n]$ represents the composite second-order Godard band components averaged over, for example, an initial 500 FFT blocks. The C filter may subsequently be configured to use coefficients calculated from a second estimate $\beta_{2,2}$ that was obtained using a higher value of $\Delta_2$ than was used to calculate the first estimate $\beta_{2,1}$. For example, the second estimate $\beta_{2,2}$ may be calculated using Equation 24 with $\Delta_2=24$, where $G_2[n]$ represents the composite second-order Godard band components averaged over, for example, a subsequent 500 FFT blocks following the initial 500 FFT blocks. The first estimate $\beta_{2,1}$ was relatively coarse due to the low value of $\Delta_2$. However, the coefficients calculated from this first estimate $\beta_{2,1}$ and used by the C filter may have achieved a significant reduction in the residual dispersion. The reduced residual dispersion enables the use of the higher value of $\Delta_2$ to obtain the second estimate $\beta_{2,2}$, which is finer and more precise than the first estimate $\beta_{2,1}$, thereby resulting in updated coefficients that enable the C filter to achieve a further reduction in the residual dispersion.

Figure 8:
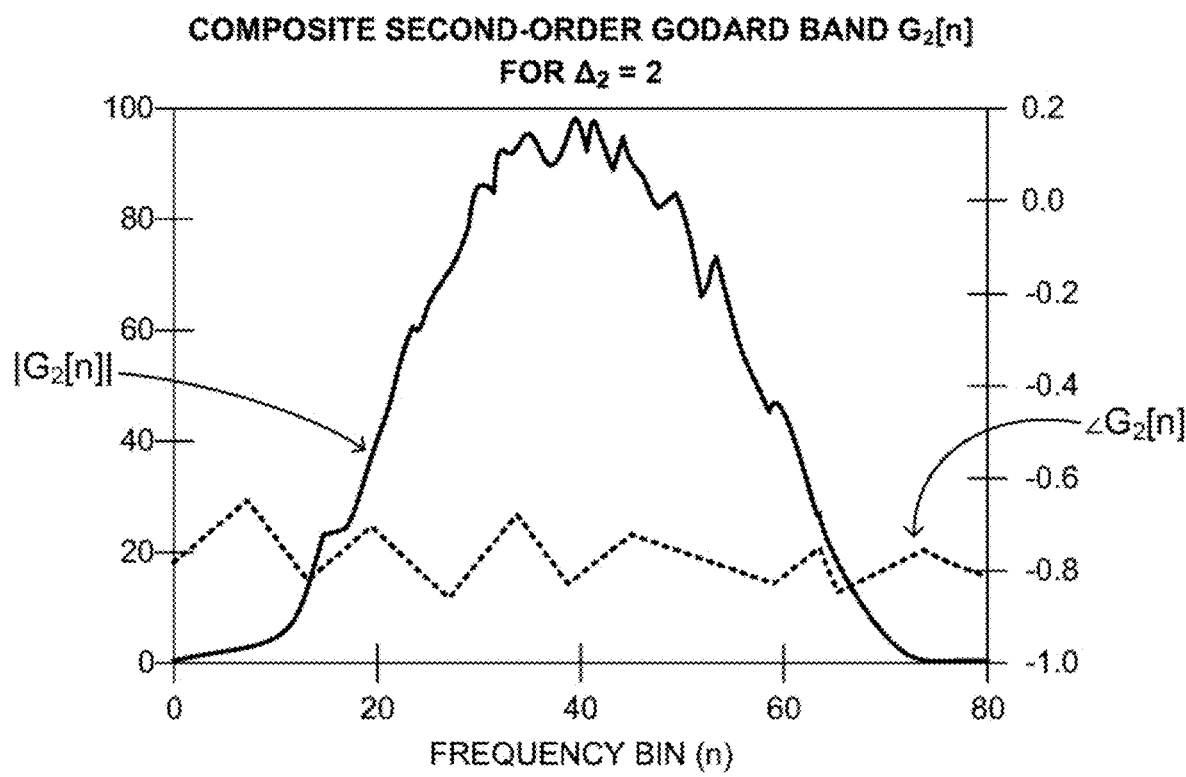
FIGS. 8 and 9 illustrate plots of the phase and magnitude of composite second-order Godard band components associated with a two-step process for blind estimation of residual CD in accordance with some examples of the technology disclosed herein.
Figure 9:
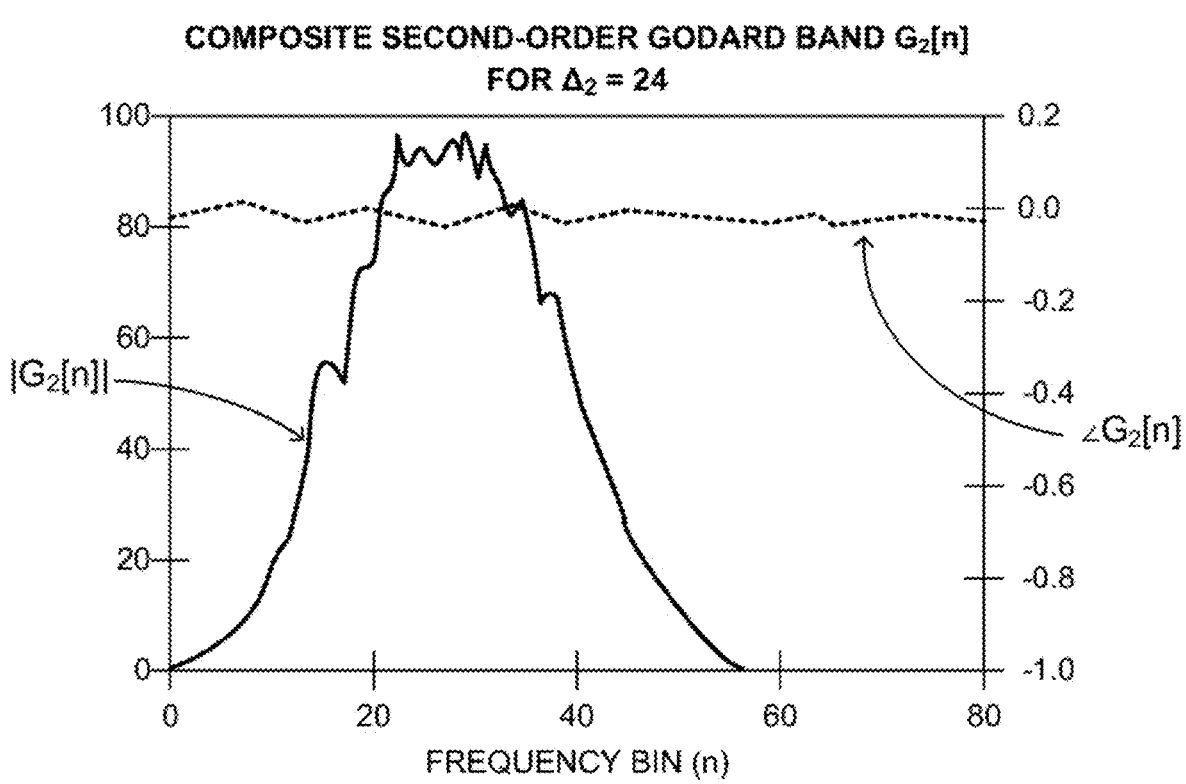

FIGS. 8 and 9 illustrate example plots of the phase and magnitude of composite second-order Godard band components $G_2[n]$ associated with a two-step process for blind estimation of residual CD. In each plot, the left axis shows the magnitude $|G_2[n]|$, which is represented by a solid line, while the right axis shows the phase $\angle G_2[n]$, in units of $\pi$ radians, which is represented by a dotted line. FIG. 8 illustrates the initial properties of $G_2[n]$ that result from using an initial value of $\Delta_2=2$ for the second differential distance when calculating the phase derivative of initial first-order Godard band components (i.e., step 1). As shown in FIG. 8, the initial phase $\angle G_2[n]$ fluctuates around $-0.85\pi$, indicating a residual dispersion D of approximately 2400 ps/nm. FIG. 9 illustrates the subsequent properties of $G_2[n]$ that result from using a subsequent value of $\Delta_2=24$ for the second differential distance when calculating the phase derivative of subsequent first-order Godard band components (i.e., step 2), where the subsequent first-order Godard band components are the result of using updated filter coefficients calculated based on the initial properties of $G_2[n]$ obtained in step 1. As is shown in FIG. 9, the phase $\angle G_2[n]$ during step 2 is much closer to 0 than during step 1 and also has significantly less fluctuation due to the lower NSR achieved with the higher value of $6\beta_2$. The phase $\angle G_2[n]$ during step 2 is approximately $-0.067\pi$, indicating a residual dispersion D of approximately 17 ps/nm. This small remaining residual dispersion may be compensated by the next update of the C filter coefficients.

In addition to enabling blind estimation of residual CD, the composite second-order Godard band components $G_2[n]$ may also be used for blind estimation of CFO. As illustrated in FIG. 3, a CFO calculation 368 may be performed on the signal 360 representing the composite second-order Godard band components $G_2[n]$. A resulting estimate of the CFO, represented by signal 370 in FIG. 3, may be used by the carrier recovery operation 330. For example, as previously described, the carrier recovery operation 330 may apply a phase rotation to each symbol of the signals 326, 328 in order to reverse the effect of a laser frequency difference between the transmitter and the receiver. The slope at which the phase rotation changes is proportional to the signal 370 generated by the CFO calculation 368.

Various techniques may be used to calculate an estimate of the CFO based on the composite second-order Godard band components $G_2[n]$. Firstly it is noted that, with the existence of a non-zero CFO, Equation 15 may be expressed as $$G_2[n] = R_2[n - \Delta_n]\exp\left(j\left(\gamma_2 + \gamma_3\left(\omega_n - \frac{2\pi\Delta_n}{N}\right)\right)\right), \quad [32]$$

where $\Delta_n$ denotes the value of the CFO in units of frequency bins and where $\gamma_2$ and $\gamma_3$ are defined in Equations 16 and 17, respectively. Considering $G_2[n]$ as a pulse defined in the frequency domain, a non-zero CFO value causes this pulse to shift by a number of bins $\Delta_n$.

Figure 10:
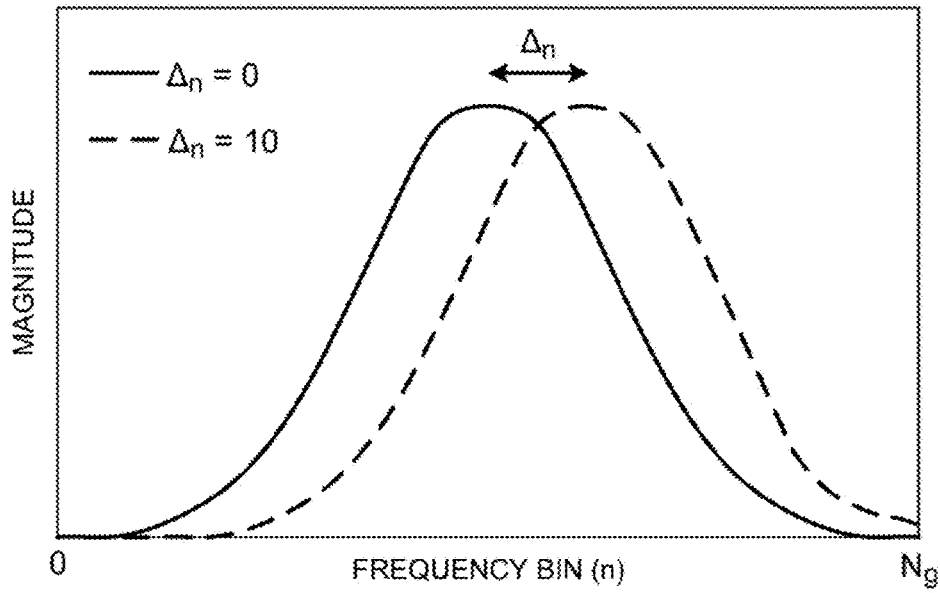
FIG. 10 illustrates a plot showing a frequency shift of second-order Godard band components caused by CFO in accordance with some examples of the technology disclosed herein.

FIG. 10 illustrates an example plot showing a frequency shift of the second-order Godard band components caused by CFO. In this example, the Godard band components are obtained with a sufficiently large averaging over FFT blocks to mitigate the effect of noise. The solid line represents $|G_2[n]|$ when $\Delta_n=0$ bins, while the dashed line represents $|G_2[n]|$ when $\Delta_n=10$ bins. The frequency shift of $\Delta_n=10$ bins is reflected by the shift of the shape to the right. According to some examples, the value of $\Delta_n$ may be determined by locating the peak location of $|G_2[n]|$, that is, the number of bins $\Delta_n$ that corresponds to the peak magnitude of $G_2[n]$, which may be expressed as $$\Delta_n = \underset{n}{\mathrm{argmax}}\{|G_2[n]|\} - \frac{N_g - \Delta_2}{2} \qquad [33]$$

where argmax denotes an operation that locates the argument (in this case, n) that gives the maximum value from the target function (in this case, $|G_2[n]|$).

Referring again to FIGS. 8 and 9, $|G_2[n]|$ in these examples has been obtained from a noisy signal with non-sufficient averaging. The shape of the Godard band components is not smooth but rather there are small ripples due to noise. If Equation 33 is used to estimate $\Delta_n$ based on the values of $|G_2[n]|$ plotted in FIG. 8 or FIG. 9, the ripples at the peak of the shape may result in estimation error. More averaging may help to eliminate the ripples at the cost of extending the time for estimation of $\Delta_n$. In the applications where acquisition time is critical, the amount of averaging may be limited. Accordingly, it may be of interest to have a CFO estimation method that is resilient to such noise ripples.

According to some examples, to mitigate the estimation error caused by noise ripples, the value of $\Delta_n$ may be determined by finding the maximum correlation between $|G_2[n]|$ and the ideal shape of $R_2[n-\Delta_n]$, which may be expressed as $$\Delta_n = \underset{\varepsilon}{\mathrm{argmax}}\left\{\sum_n |G_2[n]||R_2[n-\varepsilon]|\right\} \qquad [34]$$

where $\varepsilon$ denotes a real number satisfying $$-\frac{N_g - \Delta_2}{2} \leq \varepsilon < \frac{N_g - \Delta_2}{2},$$

and where $\Sigma_n$ denotes a summation over all the frequency bins satisfying $n \in \{0, 1, \ldots, N_g-\Delta_2-1\}$.

The correlation expressed in Equation 34 has an equivalency in the time domain. In particular, a shift in the frequency domain is equivalent to a linear phase ramp in the time domain, for example, according to the expression $$IDFT\{R_2[n-\Delta_n]\} := IDFT\{R_2[n]\}\exp\left(j2\pi\frac{\Delta_n m}{N_g - \Delta_2}\right), \qquad [35]$$

where IDFT{} denotes an inverse discrete Fourier transform at timing bins m satisfying $m \in \{0, 1, \ldots, N_g-\Delta_2-1\}$. It is also noted that the correlation expressed in Equation 34 transforms to a conjugate multiplication in time domain, which may be expressed as $$c_2[m] = IDFT\{G_2[n]\} \cdot IDFT*\{R_2[n]\} = a_2[m]\exp\left(j2\pi\frac{\Delta_n m}{N_g - \Delta_2}\right), \qquad [36]$$

form $\in \{0, 1, \ldots, N_g-\Delta_2-1\}$, where $a_2[m]$ are positive real numbers denoting magnitude of the multiplication, and where the superscript * denotes complex conjugation. Using Equation 36, the value of $\Delta_n$ may alternatively be expressed as $$\Delta_n = \frac{N_g - \Delta_2}{2\pi} L \sum_M c_2^*[m]c_2[m+1], \qquad [37]$$

where $\Sigma_m$ denotes a summation over all the timing bins satisfying $m \in \{0, 1, \ldots, N_g-\Delta_2-2\}$, and where the superscript * denotes complex conjugation.

Equation 37 may be further simplified by ignoring the magnitude $a_2[m]$ in Equation 36 and by taking into account the fact that $R_2[n]$ is a real signal centered at location $$n = \frac{N_g - \Delta_2}{2},$$

as provided in Equation 12 and illustrated in FIG. 7. It follows that $IDFT\{R_2[n]\}$ may be approximated as $$IDFT\{R_2[n]\} = \exp\left(j2\pi\frac{m(N_g - \Delta_2)/2}{N_g - \Delta_2}\right) \qquad [38]$$

form $\in \{0, 1, \ldots, N_g-\Delta_2-1\}$. Using the approximation in Equation 38, Equation 36 may be simplified to as follows $$c_2[m] = \sum_n |G_2[n]|\exp\left(j2\pi\frac{m\left(n - \frac{N_g - \Delta_2}{2}\right)}{N_g - \Delta_2}\right), \qquad [39]$$

form $\in \{0, 1, \ldots, N_g-\Delta_2-1\}$, and where $\Sigma_n$ denotes a summation over all the frequency bins satisfying $n \in \{0, 1, \ldots, N_g-\Delta_2-1\}$. This alternative expression for the conjugate multiplication $c_2[m]$ may be used in Equation 37 to calculate the value of $\Delta_n$.

Since the expected envelope of $|G_2[n]|$ resembles a sinusoid with cycle duration of $N_g - \Delta_2$ (illustrated, for example, in FIG. 7 as a slowly changing signal in the frequency domain), its inverse Fourier transform is expected to be short in the time domain, and thus the summation in the Equation 37 may be further reduced to $$\Delta_n = \frac{N_g - \Delta_2}{2\pi} L(c_2^*[-1]c_2[0] + c_2^*[0]c_2[1]), \qquad [40]$$

where the superscript * denotes complex conjugation, and where $c_2[-1]=c_2[N_g-\Delta_2-1]$ due to the periodicity of the inverse Fourier transform. In addition, Equation 39 may be implemented as 3-point IDFT with timing bins $m \in \{-1, 0, 1\}$.

Since the expected envelope of $|G_2[n]|$ is symmetrical, according to some examples the value of $\Delta_n$ may be approximated by the balance point of the shape. That is, assuming a solid object having a weight of $|G_2[n]|$ at a distance n, then the center of gravity is defined as the division of the total weight distance moment by the total mass of the object, that is $$\frac{\sum_n |G_2[n]|n}{\sum_n |G_2[n]|}.$$

According to FIG. 7, the expected balance point of the shape with zero CFO is $(N_g-\Delta_2)/2$, and thus the value of $\Delta_n$ may alternatively be expressed as $$\Delta_n = \frac{\sum_n |G_2[n]|n}{\sum_n |G_2[n]|} - (N_g-\Delta_2)/2 = \frac{\sum_n |G_2[n]|(n-(N_g-\Delta_2)/2)}{\sum_n |G_2[n]|}, \quad [41]$$

where $\Sigma_n$ denotes a summation over all the frequency bins satisfying $n \in \{0, 1, \ldots, N_g-\Delta_2-1\}$. Equation 41 is the center of gravity calculation with respect to a reference point of $(N_g-\Delta_2)/2$. The term $(n-(N_g-\Delta_2)/2)$ may be referred to as the distance to the reference point. Moreover, with the expected envelope of $G_2[n]$ resembling a sinusoid, the amount of bin shift may be determined more accurately by defining the distance to the reference point on a circle instead of a line. In particular, the distance to the reference point may be defined as a rotation $\theta[n]$, which may be expressed as $$\theta[n] = 2\pi\Delta_\tau \frac{n-(N_g-\Delta_2)/2}{N_g-\Delta_2} \quad [42]$$

where $\Delta_\tau$ is a positive real number that defines the periodicity of the rotation $\theta[n]$. It follows that the amount of bin shift $\Delta_n$ may be expressed as $$\Delta_n = \frac{N_g-\Delta_2}{2\pi\Delta_\tau} \angle \sum_n |G_2[n]|\exp(j\theta[n]) \quad [43]$$

where $\Sigma_n$ denotes a summation over all the frequency bins satisfying $n \in \{0, 1, \ldots, N_g-\Delta_2-1\}$.

The inventors have recognized that the accuracy of the estimate of $\Delta_n$ may be sensitive to the value of $\Delta_\tau$. According to one example, good accuracy may be achieved by selecting $\Delta_\tau=0.125$.

The estimate of $\Delta_n$ in units of bin number may be converted to a CFO estimate in units of Hertz using the following Equation $$CFO = \frac{\kappa\Delta_n}{N}F_s \quad [44]$$

where $F_S$ denotes the sampling frequency in Hertz, where N denotes the size of the receiver FFT, and where $\kappa$ is a positive real number that denotes a scaling factor reflecting the envelope shaping applied at the receiver C filter.

The envelope of the composite second-order Godard band components $|G_2[n]|$ represents the product of the signal envelope at the transmitter and the signal envelope at the receiver. According to some examples, the signal envelope at the transmitter is characterized by a root-raised cosine shape with a roll-off factor $\alpha_{TX}$, while the signal envelope at the receiver is characterized by a root-raised cosine shape with a roll-off factor $\alpha_{RX}$.

Figure 11:
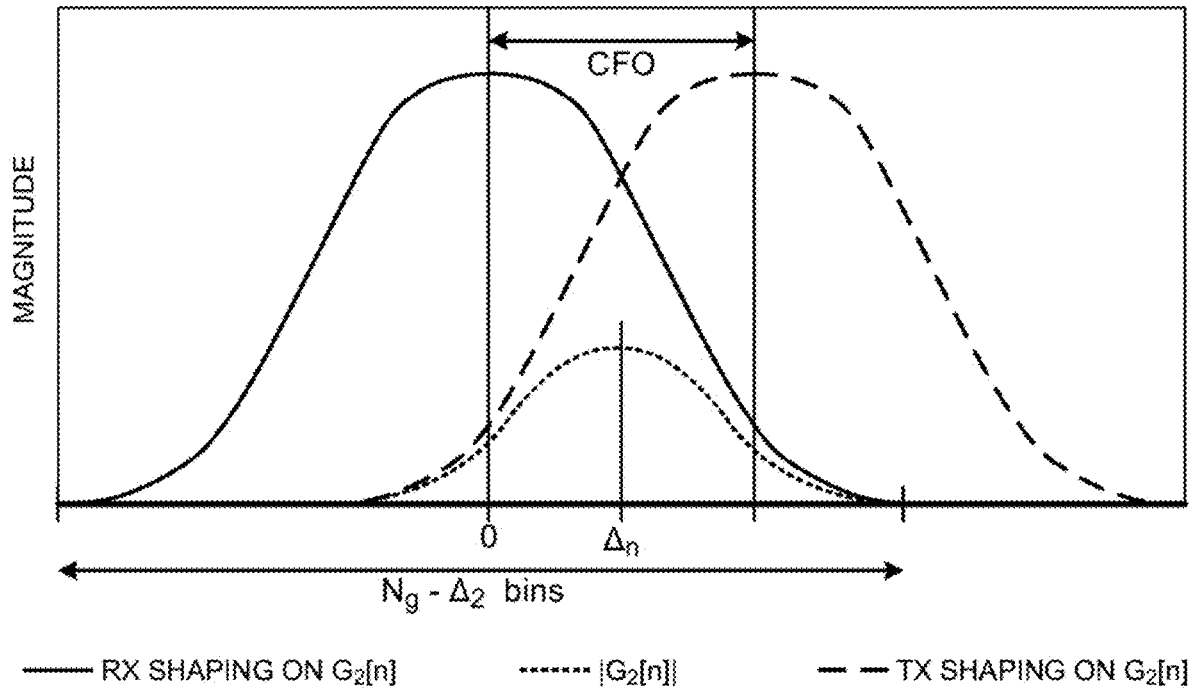
FIG. 11 illustrates a plot showing the impact of transmitter and receiver shaping on an expected envelope of second-order Godard band components in the presence of a non-zero CFO in accordance with some examples of the technology disclosed herein.

FIG. 11 illustrates an example plot showing the impact of transmitter and receiver shaping on an expected envelope of the second-order Godard band components in the presence of a non-zero CFO. In this example, both the transmitter and the receiver use root-raised cosine shaping on $G_2[n]$ with the same roll-off factor, that $\alpha_{RX}=\alpha_{TX}$. The peak location of $|G_2[n]|$ is halfway between the receiver envelope and the transmitter envelope. The distance between the receiver envelope and the transmitter envelope is created by CFO. Thus, in this example where the same root-raised cosine shaping is applied at the transmitter and the receiver, the scaling factor in Equation 44 may be selected as $\kappa=2$. According to another example, where there is no receiver shaping on $G_2[n]$, the shape of $|G_2[n]|$ is purely taken from the transmitter shaping, and the scaling factor in Equation 44 may be selected as $\kappa=1$.

In practice, where different shaping is applied at the transmitter and the receiver, that is $\alpha_{TX} \neq \alpha_{RX}$, an optimum value for the scaling factor may be $1<\kappa<2$. A mismatch in the shaping of the two envelopes may be addressed by forcing the receiver envelope to have a flat shape rather than a root-raised cosine shape. That is, by initializing the C filter to have a flat response (i.e., no shaping, such that the response has a uniform magnitude over frequency), $|G_2[n]|$ is expected to have almost the same shape as the transmitter shaping window. Under these conditions, it is possible to use a scaling factor of $\kappa=1$ in Equation 44, regardless of the transmitter shaping. In practice, a "flat" C filter generally does not have a perfectly flat passband, but instead has a small amount of roll-off toward the edges. According to some examples, this roll-off may be compensated for by the scaling factor $\kappa$.

In practice, when the CFO is large, one tail of $|G_2[n]|$ may land outside of the $N_g-\Delta_2$ frequency bins. In such cases, the shape of $|G_2[n]|$ may not be symmetrical, resulting in bias on the estimate of the CFO. This bias may be avoided by removing values of $|G_2[n]|$ having magnitudes lower than a predefined threshold $\delta$, that is, by pre-trimming the tails on both sides of $|G_2[n]|$ to maintain the symmetrical shape. Accordingly, truncated composite second-order Godard band components $\hat{G}_2[n]$ may be expressed as $$\hat{G}_2[n] = \begin{cases} |G_2[n]|, & \text{if } |G_2[n]| \geq \delta \\ 0, & \text{otherwise.} \end{cases} \quad [45]$$

Selecting a higher value for the threshold $\delta$ may reduce the bias in the estimate of $\Delta_n$, while selecting a lower value for the threshold $\delta$ may increase the SNR of the estimate of $\Delta_n$ by taking more samples of $|G_2[n]|$ into account. According to one example, the threshold $\delta$ may be defined by the following expression:

$$\delta = \frac{1}{\sqrt{2}} \sqrt{\frac{1}{N_g - \Delta_2} \sum_n |G_2[n]|^2} \quad [46]$$

where $\Sigma_n$ denotes a summation over all the frequency bins satisfying $n \in \{0, 1, \ldots, N_g - \Delta_2 - 1\}$.

Taking into account this technique for eliminating bias in the estimation of the CFO, Equation 43 may be modified to the following:

$$\Delta_n = \frac{N_g - \Delta_2}{2\pi \Delta_\tau} \angle \sum_n \hat{G}_2[n] \exp(j\theta[n]) \quad [47]$$

where $\Sigma_n$ denotes a summation over all the frequency bins satisfying $n \in \{0, 1, \ldots N_g - 4_2 - 1\}$.

Figure 12:
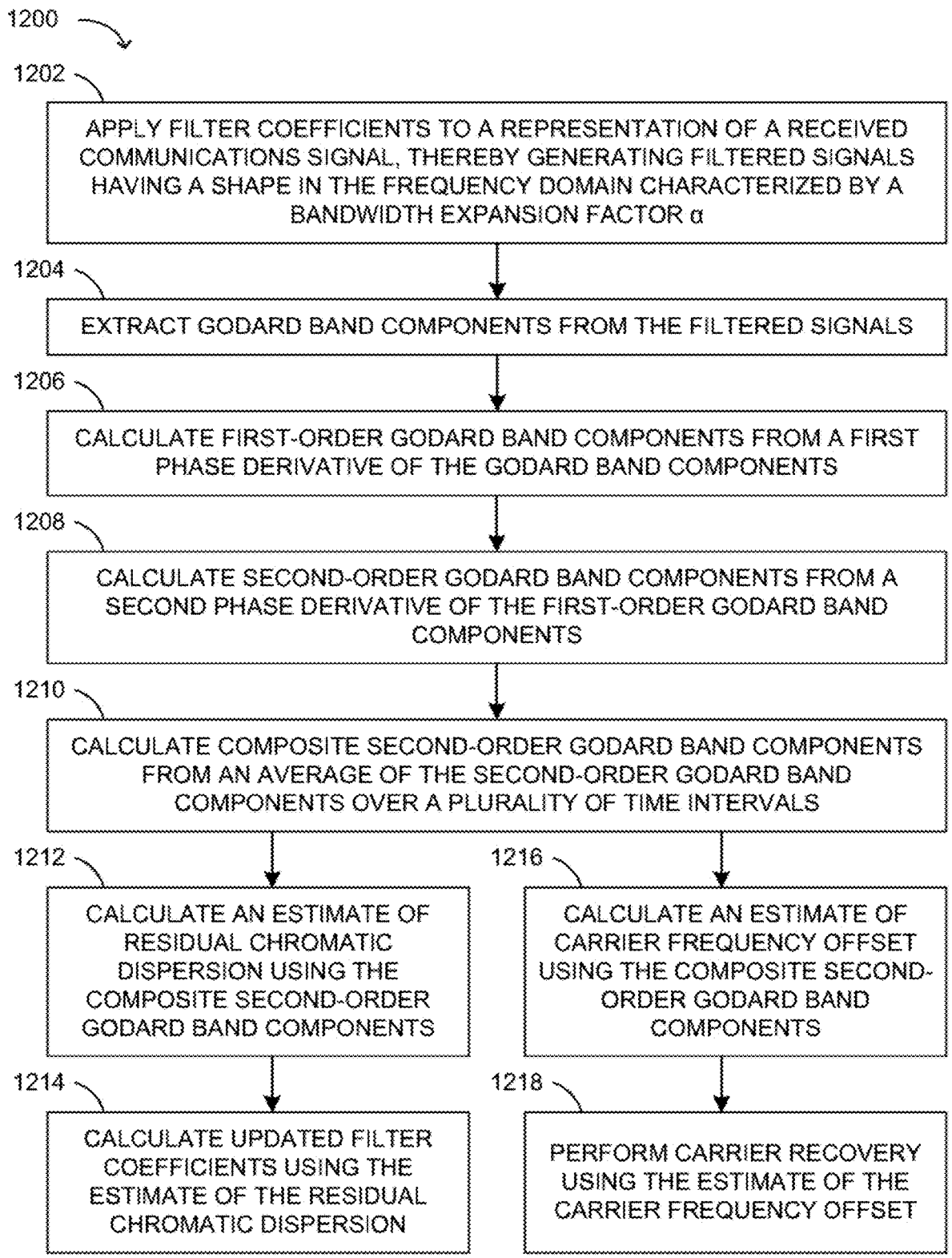
FIG. 12 illustrates an example method for blind estimation of residual CD and CFO in accordance with some examples of the technology disclosed herein.

FIG. 12 illustrates an example method 1200 for blind estimation of residual CD and CFO in accordance with some examples of the technology disclosed herein. The method 1200 may be performed at a receiver device, such as the receiver device 104 or 200. In general, the method 1200 may be implemented using circuitry configured to perform the various steps of the method 1200. The circuitry may comprise various combinations of processors (including DSPs), computer-readable media storing computer-executable instructions or code, ASICs, and the like.

At 1202, filtered signals are generated by applying filter coefficients to a digital representation of a received communications signal. The communications signal may comprise a degraded version of a communications signal generated by a transmitter device. For example, the communications signal may comprise a degraded version of the optical signal 204 transmitted by a transmitter device, where the optical signal 204 conveys a stream of symbols transmitted at an angular symbol frequency $$\omega_s = \frac{2\pi}{T},$$

where T denotes the symbol period. The digital representation of the communication signal may comprise, for example, the signals 314, 316 described with respect to FIG. 3. The filter coefficients may comprise the coefficients 319 applied by the C filter 318. The filtered signals may comprise the signals 320, 322. As described previously, the filtered signals may have a shape in the frequency domain which is characterized by a bandwidth expansion factor α, where α is a real number satisfying 0<α≤1. According to some examples, the filtered signals may have a substantially raised cosine shape resulting from applying root-raised cosine shapes at both the transmitter and the receiver. According to other examples, the filtered signals may have a substantially raised cosine shape resulting from applying a root-raised cosine shape at the transmitter, and applying a substantially flat shape at the receiver. These conditions may be used temporarily during receiver start-up, and once CD and/or CFO have been estimated according to the method 1200, the receiver may be configured to apply a root-raised cosine shape similar to the one applied at the transmitter, thereby minimizing ISI during subsequent operation of the receiver. According to some examples, the filtered signals may have some other shape in the frequency domain, such as a sinc shape. In general, the shape may be determined by the value of the bandwidth expansion factor α.

At 1204, Godard band components are extracted or selected from the filtered signals calculated at 1202. For example, the Godard band extraction operation 344 may be applied to the signals 320, 322, thereby resulting in the signals 346, 348. The Godard band components may comprise those components defined over frequency bins that correspond to the range of angular frequencies $$\omega = -\frac{\pi(1+\alpha)}{T} \ldots -\frac{\pi(1-\alpha)}{T}, +\frac{\pi(1-\alpha)}{T} \ldots +\frac{\pi(1+\alpha)}{T}.$$

At 1206, first-order Godard band components are calculated from a phase derivative of the Godard band components extracted at 1204. For example, the first-order Godard band calculation 350 is applied to the signals 346, 348, thereby resulting in the signals 352. The phase derivative performed at 1206 may use a first differential distance $\Delta_1 = N_g$, where $$N_g = \frac{(L-1)N}{L},$$

and where L denotes the up-sampling factor of the signal.

At 1208, second-order Godard band components are calculated from a phase derivative of the first-order Godard band components calculated at 1206. For example, the second-order Godard band calculation 354 is applied to the signals 352, thereby resulting in the signals 356. The phase derivative performed at 1208 may use a second differential distance $\Delta_2$, where $\Delta_2$ is a positive integer.

At 1210, composite second-order Godard band components are calculated from an average over a plurality of time intervals of the second-order Godard band components generated at 1208. For example, the summation operation 358 is applied to the signals 356, thereby resulting in the signal 360.

At 1212, an estimate of residual CD is calculated using the composite second-order Godard band components calculated at 1210. For example, the residual CD calculation 362 is performed on the signal 360, thereby resulting in the signal 364. As described previously, the residual CD calculation 362 may include calculating third-order Godard band components from a third phase derivative of the composite second-order Godard band components at a third differential distance, calculating an estimate of a third-order phase term using the third-order Godard band components, and using the estimate of the third-order phase term to calculate an estimate of the second-order phase term. Alternatively, the residual CD calculation 362 may include using the composite second-order Godard band to directly calculate an estimate of the third-order phase term, and using that estimate to calculate the estimate of the second-order phase term. For example, the estimate of residual CD may be calculated using a timing bin corresponding to a peak magnitude of an inverse Fourier transform of the composite second-order Godard band components.

At 1214, updated filter coefficients are calculated using the residual CD estimate calculated at 1212. For example, the first coefficient calculation operation 366 is applied to the signal 364, thereby generating the signal 319. The method

1200 may then return to step 1202, with the newly updated filter coefficients being applied to a newly received communications signal.

At 1216, an estimate of CFO is calculated using the composite second-order Godard band components calculated at 1210. For example, the CFO calculation 368 is performed on the signal 360, thereby resulting in the signal 370. As described previously with respect to Equations 33-44, the estimate of the CFO may be calculated using the magnitudes of the composite second-order Godard band components. According to one example, the CFO calculation 368 may include determining a frequency (represented, for example, by a number of frequency bins $\Delta_n$) that corresponds to the peak value of $|G_2[n]|$, as expressed in Equation 33, and using that frequency to estimate the CFO. According to another example, the CFO calculation 368 may include determining a frequency (represented, for example, by a number of frequency bins $\Delta_n$) that corresponds to a center of gravity of $|G_2[n]|$, as expressed in Equation 41, and using that frequency to estimate the CFO. According to another example, the CFO calculation 368 may include calculating a frequency shift (represented, for example, by a number of frequency bins $\Delta_n$) of an expected shape of $G_2[n]$ that maximizes a correlation between $G_2[n]$ and the expected shape of $G_2[n]$, as expressed in Equation 34, and using that frequency shift to estimate the CFO. According to another example, the CFO calculation 368 may include calculating an autocorrelation of an inverse Fourier transform of $G_2[n]$, as expressed in Equation 37 or 40, and using the autocorrelation to estimate the CFO. According to some examples, CFO calculation 368 may be performed using only the composite second-order Godard band components having magnitudes equal to or greater than a predefined threshold, such as the threshold $\delta$ defined in Equation 46. In other words, the CFO calculation 368 may exclude the use of any composite second-order Godard band components having magnitudes lower than the predefined threshold (see Equation 45 in combination with Equation 47).

At 1218, carrier recovery is performed using the estimate of the CFO calculated at 1216. For example, the carrier recovery operation 330 is applied to the signals 326, 328 based on the signal 370 generated by the CFO calculation 368.

According to some examples, the calculations at 1212, 1214 may be performed in parallel to performing the calculations at 1216, 1218. According to other examples, the calculations at 1212, 1214 may be performed before or after performing the calculations at 1216, 1218. According to other examples, the calculations at 1212, 1214 may be performed without performing the calculations at 1216, 1218. According to other examples, the calculations at 1216, 1218 may be performed without performing the calculations at 1212, 1214.

According to some examples, the phase derivative performed at 1208 is initially performed using a first value of the differential distance $\Delta_2$, and then the method 1200 is repeated using a second higher value of the differential distance $\Delta_2$.

Although the calculations have been described as being performed in the frequency domain, they may alternatively be performed in the time domain. The algorithms for estimation of residual CD and CFO may be fully applied in ASIC hardware, or may be partly accomplished by a low-speed firmware processor and/or field-programmable gate array (FPGA) which assists the ASIC in the residual CD and CFO calculations.

According to the method 1200, it may be possible to obtain blind estimates of residual CD and/or CFO, meaning estimates that are independent of clock phase offset, and optionally independent of DGD, SOP rotation, and PDL, where the blind estimates also do not require any prior knowledge of transmitter signal patterns. Thus, the method 1200 may be performed during the first stages of start-up of a receiver device, prior to the clock recovery circuit being activated.

The scope of the claims should not be limited by the details set forth in the examples, but should be given the broadest interpretation consistent with the description as a whole.

What is claimed is:

1. A receiver apparatus comprising:
   a communication interface configured to receive a communications signal conveying symbols at a symbol period T, wherein T is a positive real number;
   circuitry configured to apply filter coefficients to a digital representation of the communications signal, thereby generating filtered signals having a shape in the frequency domain characterized by a bandwidth expansion factor $\alpha$, wherein $\alpha$ is a real number satisfying $0<\alpha>1$, and wherein components of the filtered signals correspond to a range of angular frequencies $$\omega = -\frac{\pi(1+\alpha)}{T} \ldots -\frac{\pi(1-\alpha)}{T}, +\frac{\pi(1-\alpha)}{T} \ldots +\frac{\pi(1+\alpha)}{T};$$

circuitry configured to calculate first-order components from a first phase derivative of the components of the filtered signals at a first differential distance;
   circuitry configured to calculate second-order components from a second phase derivative of the first-order components at a second differential distance;
   circuitry configured to calculate composite second-order components from an average of the second-order components over a plurality of time intervals; and
   circuitry configured to calculate, using the composite second-order components, at least one of (i) an estimate of residual chromatic dispersion (CD) associated with the filtered signals, and (ii) an estimate of carrier frequency offset (CFO) associated with the filtered signals.

2. The receiver apparatus as claimed in claim 1, further comprising
   circuitry configured to calculate updated filter coefficients using the estimate of the residual CD; and
   circuitry configured to apply the updated filter coefficients to the digital representation of the communications signal, thereby generating updated filtered signals.

3. The receiver apparatus as claimed in claim 2, wherein the estimate of the residual CD comprises an initial estimate based on an initial value of the second differential distance, the receiver apparatus further comprising
   circuitry configured to calculate a subsequent estimate of the residual CD associated with the updated filtered signals based on a subsequent value of the second differential distance,
   wherein the subsequent value of the second differential distance exceeds the initial value of the second differential distance, and
   wherein the initial estimate of the residual CD exceeds the subsequent estimate of the residual CD.

4. The receiver apparatus as claimed in claim 1, further comprising
  circuitry configured to calculate third-order components from a third phase derivative of the composite second-order components at a third differential distance; and
  circuitry configured to calculate the estimate of the residual CD using an average of the third-order components over a plurality of frequencies.

5. The receiver apparatus as claimed in claim 1, further comprising
  circuitry configured to calculate a timing bin corresponding to a peak magnitude of an inverse Fourier transform of the composite second-order components; and
  circuitry configured to calculate the estimate of the residual CD using the timing bin.

6. The receiver apparatus as claimed in claim 1, further comprising
  circuitry configured to perform carrier recovery on the filtered signals using the estimate of the CFO.

7. The receiver apparatus as claimed in claim 1, further comprising
  circuitry configured to calculate either a frequency corresponding to a peak magnitude of the composite second-order components or a frequency corresponding to a center of gravity of the magnitudes of the composite second-order components; and
  circuitry configured to calculate the estimate of the CFO using the frequency.

8. The receiver apparatus as claimed in claim 1, further comprising
  circuitry configured to calculate a frequency shift of an expected shape of the composite second-order components that maximizes a correlation between the composite second-order components and the expected shape; and
  circuitry configured to calculate the estimate of the CFO using the frequency shift.

9. The receiver apparatus as claimed in claim 1, further comprising
  circuitry configured to calculate an autocorrelation of an inverse Fourier transform of the composite second-order components; and
  circuitry configured to calculate the estimate of the CFO using the autocorrelation.

10. The receiver apparatus as claimed in claim 1, wherein the estimate of the CFO is calculated using only the composite second-order components having magnitudes equal to or greater than a predefined threshold.

11. A method comprising:
  receiving a communications signal conveying symbols at a symbol period T, wherein T is a positive real number;
  applying filter coefficients to a digital representation of the communications signal, thereby generating filtered signals having a shape in the frequency domain characterized by a bandwidth expansion factor $\alpha$, wherein $\alpha$ is a real number satisfying $0 < \alpha \leq 1$, and wherein components of the filtered signals correspond to a range of angular frequencies $$\omega = -\frac{\pi(1+\alpha)}{T} \ldots -\frac{\pi(1-\alpha)}{T}, +\frac{\pi(1-\alpha)}{T} \ldots +\frac{\pi(1+\alpha)}{T};$$

calculating first-order components from a first phase derivative of the components of the filtered signals at a first differential distance;
  calculating second-order components from a second phase derivative of the first-order components at a second differential distance;
  calculating composite second-order components from an average of the second-order components over a plurality of time intervals; and
  using the composite second-order components, calculating at least one of (i) an estimate of residual chromatic dispersion (CD) associated with the filtered signals, and (ii) an estimate of carrier frequency offset (CFO) associated with the filtered signals.

12. The method as claimed in claim 11, further comprising
  calculating updated filter coefficients using the estimate of the residual CD; and
  applying the updated filter coefficients to the digital representation of the communications signal, thereby generating updated filtered signals.

13. The method as claimed in claim 12, wherein the estimate of the residual CD comprises an initial estimate based on an initial value of the second differential distance, the method further comprising
  calculating a subsequent estimate of the residual CD associated with the updated filtered signals based on a subsequent value of the second differential distance,
  wherein the subsequent value of the second differential distance exceeds the initial value of the second differential distance, and
  wherein the initial estimate of the residual CD exceeds the subsequent estimate of the residual CD.

14. The method as claimed in claim 11, further comprising
  calculating third-order components from a third phase derivative of the composite second-order components at a third differential distance; and
  calculating the estimate of the residual CD using an average of the third-order components over a plurality of frequencies.

15. The method as claimed in claim 11, further comprising
  calculating a timing bin corresponding to a peak magnitude of an inverse Fourier transform of the composite second-order components; and
  calculating the estimate of the residual CD using the timing bin.

16. The method as claimed in claim 11, further comprising
  performing carrier recovery on the filtered signals using the estimate of the CFO.

17. The method as claimed in claim 11, further comprising
  calculating either a frequency corresponding to a peak magnitude of the composite second-order components or a frequency corresponding to a center of gravity of the magnitudes of the composite second-order components; and
  calculating the estimate of the CFO using the frequency.

18. The method as claimed in claim 11, further comprising
  calculating a frequency shift of an expected shape of the composite second-order components that maximizes a correlation between the composite second-order components and the expected shape; and
  calculating the estimate of the CFO using the frequency shift.

19. The method as claimed in claim 11, further comprising
  calculating an autocorrelation of an inverse Fourier transform of the composite second-order components; and
  calculating the estimate of the CFO using the autocorrelation.

20. The method as claimed in claim 11, wherein the estimate of the CFO is calculated using only the composite second-order components having magnitudes equal to or greater than a predefined threshold.

\* \* \* \* \*

UNITED STATES PATENT AND TRADEMARK OFFICE
CERTIFICATE OF CORRECTION

PATENT NO. : 11,451,304 B1
APPLICATION NO. : 17/524251
DATED : September 20, 2022
INVENTOR(S) : Tung Trong Nguyen, Timothy James Creasy and Shahab Oveis Gharan It is certified that error appears in the above-identified patent and that said Letters Patent is hereby corrected as shown below:

In the Claims

Line 10 of Claim 1 should read:
$0 < \alpha \leq 1$, and wherein components of the filtered signals Signed and Sealed this
Eighteenth Day of October, 2022

Katherine Kelly Vidal
*Director of the United States Patent and Trademark Office*